United States Patent
Motoyoshi et al.

(10) Patent No.: US 9,352,464 B2
(45) Date of Patent: *May 31, 2016

(54) ROBOT, CARRIAGE DEVICE, AND CONTROL METHOD USING INERTIA SENSOR

(71) Applicant: Seiko Epson Corporation, Tokyo (JP)

(72) Inventors: Masaki Motoyoshi, Shiojiri (JP); Izumi Iida, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,255

(22) Filed: Feb. 6, 2014

(65) Prior Publication Data

US 2014/0156077 A1    Jun. 5, 2014

Related U.S. Application Data

(63) Continuation of application No. 13/890,572, filed on May 9, 2013, now Pat. No. 8,849,456, which is a continuation of application No. 12/814,908, filed on Jun. 14, 2010, now Pat. No. 8,463,440.

(30) Foreign Application Priority Data

Jun. 15, 2009   (JP) .................................. 2009-141943

(51) Int. Cl.
    *B25J 9/16*    (2006.01)
(52) U.S. Cl.
    CPC .............. *B25J 9/1633* (2013.01); *B25J 9/1638* (2013.01); *B25J 9/1651* (2013.01);
    (Continued)

(58) Field of Classification Search
    CPC ...... B25J 9/1633; B25J 9/1638; B25J 9/1651; G01C 25/005; G01C 25/00; G01C 32/34; G01C 32/26; G01C 32/367; G05B 2219/39343; G05B 2219/39178; G05B 2219/39319; G05B 2219/40549; G05B 2219/36473; G05B 2219/37388; G05B 2219/40547; G05B 2219/39185; G05B 2219/41128; G05B 2219/42104; G05B 2219/42225; G09B 29/003; G09B 29/10; G01S 19/34; G01S 19/48; H04W 52/02; Y10S 901/09; Y10S 901/46

See application file for complete search history.

(56) References Cited

U.S. PATENT DOCUMENTS 4,906,907 A * 3/1990 Tsuchihashi ............... B25J 9/06
                                                      318/568.16
6,318,951 B1  11/2001 Schmidt et al.
(Continued)

FOREIGN PATENT DOCUMENTS

CN          1411420 A        4/2003
CN        101393463 A        3/2009
(Continued)

OTHER PUBLICATIONS

Zhang, T., Li, G., Liang, L., "Switch Variable Structure Control of a Flexible Manipulator With Acceleration Feedback", Chinese Journal of Mechanical Engineering, 2002, 38(3).

*Primary Examiner* — Khoi Tran
*Assistant Examiner* — Robert Nguyen
(74) *Attorney, Agent, or Firm* — Harness, Dickey & Pierce, P.L.C.

(57) ABSTRACT

A robot includes: an arm; a driving source that pivots the arm; an angle sensor that detects a pivot angle and outputs pivot angle information; an inertia sensor that is attached to the arm and outputs inertial force information; a control command generating unit that outputs a control command defining rotational operation of the arm; a control conversion determining unit that determines whether the inertial force information is used when the driving source is controlled; and an arm operation control unit that performs a first control based on the control command, the pivot angle information, and the inertial force information, if the control conversion determining unit determines that the inertial force information should be used, and performs a second control based on the control command and the pivot angle information, if the control conversion determining unit determines that the inertial force information should not be used.

5 Claims, 12 Drawing Sheets

(52) U.S. Cl.
CPC ............... *G05B 2219/39195* (2013.01); *G05B 2219/41128* (2013.01); *G05B 2219/42104* (2013.01); *G05B 2219/42225* (2013.01); *Y10S 901/09* (2013.01); *Y10S 901/46* (2013.01)

(56) References Cited

U.S. PATENT DOCUMENTS

| | | | |
|---|---|---|---|
| 6,322,119 B1 | 11/2001 | Schmidt et al. | |
| 7,100,445 B2 * | 9/2006 | Morell | 73/504.12 |
| 8,065,037 B2 * | 11/2011 | Danko | G05B 13/024 318/266 |
| 2001/0024611 A1 | 9/2001 | Woodruff et al. | |
| 2001/0043856 A1 | 11/2001 | Woodruff et al. | |
| 2002/0102156 A1 | 8/2002 | Woodruff et al. | |
| 2003/0198551 A1 | 10/2003 | Schmidt et al. | |
| 2004/0128031 A1 * | 7/2004 | Wang | G01C 25/005 700/258 |
| 2004/0228719 A1 | 11/2004 | Woodruff et al. | |
| 2005/0246061 A1 | 11/2005 | Oaki et al. | |
| 2006/0132078 A1 | 6/2006 | Iwashita et al. | |
| 2006/0178775 A1 * | 8/2006 | Zhang | B25J 9/1674 700/245 |
| 2008/0140257 A1 * | 6/2008 | Sato | B25J 9/1633 700/258 |
| 2008/0262729 A1 * | 10/2008 | Bacon | G01C 21/16 701/507 |
| 2009/0133467 A1 * | 5/2009 | Mori | G01C 19/00 73/1.77 |
| 2010/0076639 A1 * | 3/2010 | Shu | G05D 1/027 701/23 |
| 2010/0103100 A1 | 4/2010 | Yamamoto | |
| 2010/0286822 A1 * | 11/2010 | Zaier | B62D 57/032 700/245 |
| 2010/0286826 A1 * | 11/2010 | Tsusaka | B25J 9/1633 700/254 |
| 2011/0190933 A1 * | 8/2011 | Shein | B62D 55/075 700/258 |
| 2012/0150347 A1 * | 6/2012 | Ohga | B25J 9/1633 700/254 |
| 2012/0179294 A1 * | 7/2012 | Sasai | B25J 9/1694 700/254 |
| 2012/0185092 A1 * | 7/2012 | Ku | B25J 13/088 700/258 |

FOREIGN PATENT DOCUMENTS

| | | | |
|---|---|---|---|
| JP | 07-009374 | | 1/1995 |
| JP | 07-295650 | | 11/1995 |
| JP | 07295650 A | * | 11/1995 |
| JP | 09-085658 A | | 3/1997 |
| JP | 10-128688 A | | 5/1998 |
| JP | 2005-242794 A | | 9/2005 |
| JP | 2010-284770 A | | 12/2010 |
| WO | WO-2009-035124 A1 | | 3/2009 |

* cited by examiner

ROBOT, CARRIAGE DEVICE, AND CONTROL METHOD USING INERTIA SENSOR

CROSS-REFERENCE TO RELATED APPLICATIONS

This is a continuation patent application of U.S. patent application Ser. No. 13/890,572 filed May 9, 2013, which is a continuation of U.S. application Ser. No. 12/814,908 filed Jun. 14, 2010, now U.S. Pat. No. 8,463,440 issued Jun. 11, 2013, which claims priority to Japanese Patent Application No. 2009-141943, filed Jun. 15, 2009, all of which are expressly incorporated by reference herein in their entireties.

BACKGROUND

1. Technical Field

The present invention relates to a robot capable of moving a terminal device, which is attached to a front end of an arm, to a wanted position, a carriage device capable of moving the terminal device, which is attached to the movable member, to a wanted position, and a control method using an inertia sensor to control these devices.

2. Related Art

In the past, it has been widely known an apparatus such as a robot capable of moving a terminal device, which is attached to a front end of an arm by pivoting the arm and so on, to a wanted position and operating the terminal device at the position. For example, there are known a feeding/releasing material device having a gripping terminal and feeding and releasing a matching target part to and from a machining apparatus, an applicator robot having an applicator terminal, a welding robot having a welding terminal or the like.

When the robot is driven, a control method is used, in which a pivot angle of a driving source such as a motor for driving a robot arm is measured, a position of a front end of the arm or the like is controlled based on information on the measured angle. However, since a transmission mechanism for transmitting a driving force to the arm from the driving source or the arm is not made of a rigid body, the transmission mechanism or the arm is deformed. As a result, there is a case in which the position of the front end side of the arm, of which the position is controlled based on the angle information, does not necessarily coincide with an actual position. In addition, there is a problem in that vibration is generated since the transmission mechanism or the arm is deformed upon the operation. In order to solve the problem, a method is devised in which an inertia sensor is attached to the front end of the arm to measure the movement of the front end and thus control the angular velocity information obtained by the inertia sensor. JP-A-7-9374 discloses a control method for an articulated robot and an articulated robot capable of determining a position with high precision in a case in which rigidity is low and preventing the precision from being deteriorated due to vibration, by controlling operation of the arm using an output signal of the inertia sensor.

However, in order to obtain a pivot angle of an arm from the output of the inertia sensor, it is necessary to integrate the output of the inertia sensor. In addition, there is a problem in that if the integration is repeated, it is liable to receive an effect of a drift of a reference potential of the inertia sensor, so that a control device is capable of highly misrecognizing the information. In JP-A-2005-242794, a robot control device and a robot control method are disclosed to preclude an error factor which is varied in a low frequency, such as a drift of the reference potential, by using a low frequency component from an output of an angle sensor, in which an output of an angular velocity sensor is used to control a high frequency component only which is an integral value of the output.

However, there is a problem in that an error due to the effect of the noise, the effect in delay of signal transmission or the like is possibly contained in the output of the inertia sensor, and thus the control device easily misrecognizes the information due to the error. Since the effect from the noise of the inertia sensor or the effect from the delay of the signal transmission is a phenomenon which happens even in a high frequency, the control device or the control method disclosed in JP-A-2005-242794 cannot cope with the problem.

SUMMARY

The invention has been made to solve at least a part of the problems, and may be implemented as the following embodiments or application example.

APPLICATION EXAMPLE 1

A robot according to this application example includes an arm with one end pivotally supported; a driving source that pivots the arm; an angle sensor that detects a pivot angle of the driving source and outputs pivot angle information of the driving source; an inertia sensor that is attached to the arm and outputs angular velocity information of the arm by detecting the angular velocity of the arm rotation; a control command generating unit that outputs a control command defining rotational operation of the arm; a control conversion determining unit that determines whether the angular velocity information is used or not when the driving source is controlled to control operation of the arm; and an arm operation control unit that performs a first control based on the control command, the pivot angle information, and the angular velocity information, to control the driving source and thus control the operation of the arm, if the control conversion determining unit determines to use the angular velocity information, and performs a second control which is different from the first control, based on the control command and the pivot angle information, to control the driving source and thus control the operation of the arm, if the control conversion determining unit determines not to use the angular velocity information.

In the robot according to this application example, the control conversion determining unit determines whether the angular velocity information is used or not when controlling the operation of the arm. The arm operation control unit performs the first control based on the control command, the pivot angle information, and the angular velocity information, and performs a second control based on the control command and the pivot angle information, in accordance with the determination of the control conversion determining unit. Therefore, in order to perform the appropriate control, the control in which the angular velocity information is appropriately used or is not used can be selected, in cases in which the effect obtained by using the angular velocity information is high and is low, or in cases in which the error of the angular velocity information is relatively high and is relatively low. In addition, the control method which is effective by using the angular velocity information can be selected and performed.

The first control is a control method of suppressing vibration or the like by using the control command, the pivot angle information and the angular velocity information, and is called, for example, a state feedback control. The second control is a control method of rendering it to approach a wanted position stably by using the control command and the pivot angle information, and is, for example, a PID (Proportional Integral Differential) control based on the angle of the angle sensor or the angular velocity of its differential value, or the like.

APPLICATION EXAMPLE 2

A robot according to this application example includes an arm with one end pivotally supported; a driving source that pivots the arm; an angle sensor that detects a pivot angle of the driving source and outputs pivot angle information of the driving source; an inertia sensor that is attached to the arm and outputs angular velocity information of the arm by detecting the angular velocity of the arm rotation; a control command generating unit that outputs a control command defining rotational operation of the arm; a control conversion determining unit that determines a weighted constant of the angular velocity information when the driving source is controlled to control operation of the arm; and an arm operation control unit that controls the driving source and thus controls the operation of the arm based on the control command, the pivot angle information, and the angular velocity information which is multiplied by the weighted constant determined by the control conversion determining unit.

In the robot according to this application example, the control conversion determining unit determines the weighted constant of the angular velocity information, and the arm operation control unit controls the operation of the arm based on the control command, the pivot angle information, and the angular velocity information which is multiplied by the weighted constant determined by the control conversion determining unit. As a result, when the appropriate control is performed, since the weighted constant is determined by comprehensively considering the influence obtained by using the angular velocity information and the influence resulted from the error of the angular velocity information, the operation control of the arm can be performed which increases the effect obtained by using the angular velocity information and reduces the influence resulted from the error of the angular velocity information overall.

APPLICATION EXAMPLE 3

In the robot according to this application example, it is preferable that a threshold value is previously set in the angular velocity information, and the control conversion determining unit compares the angular velocity information with the threshold value to determine whether the angular velocity information is used or not, or to determine the weighted constant of the angular velocity information.

According to the robot of this application example, by comparing the angular velocity information with the threshold value, it is determined whether the angular velocity information is used or not, or the weighted constant of the angular velocity information is determined. More appropriate control can be performed by using the angular velocity information, as compared with the case in which the angular velocity information is not used. However, if the angular velocity is reduced, the effect obtained by using the angular velocity information is decreased, and simultaneously, the influence resulted from the error of the angular velocity information by the noise or the like is obtained. Therefore, the precision is lowered as compared with the case in which only the angle information is used. Since it is determined whether the angular velocity information is used or not, or the weighted constant of the angular velocity information is determined, by comparing the angular velocity information with the threshold value, the operation control of the arm can be performed which increases the effect obtained by using the angular velocity information and reduces the influence resulted from the error of the angular velocity information overall.

APPLICATION EXAMPLE 4

In the robot according to this application example, it is preferable that a threshold value is previously set in the pivot angle information, and the control conversion determining unit compares the pivot angle information with the threshold value to determine whether the angular velocity information is used or not, or to determine the weighted constant of the angular velocity information.

According to the robot of this application example, by comparing the pivot angle information with the threshold value, it is determined whether the angular velocity information is used or not, or the weighted constant of the angular velocity information is determined. More appropriate control can be performed by using the angular velocity information, as compared with the case in which the angular velocity information is not used. However, in a state in which the pivot angle is increased and thus approaches the wanted angle, the angular velocity is reduced. If the angular velocity is reduced, the effect obtained by using the angular velocity information is decreased, and simultaneously, the influence resulted from the error of the angular velocity information by the noise or the like is obtained. Therefore, the precision is lowered as compared with the case in which only the angle information is used. Since it is determined whether the angular velocity information is used or not, or the weighted constant of the angular velocity information is determined, by comparing the angular velocity information with the threshold value, the operation control of the arm can be performed which increases the effect obtained by using the angular velocity information and reduces the influence resulted from the error of the angular velocity information overall.

APPLICATION EXAMPLE 5

In the robot according to this application example, it is preferable that a threshold value is previously set in an integral value of one or more times of the angular velocity information, and the control conversion determining unit compares the integral value of one or more times of the angular velocity information with the threshold value to determine whether the angular velocity information is used or not, or to determine the weighted constant of the angular velocity information.

According to the robot of this application example, by comparing the integral value of one or more times of the angular velocity information with the threshold value, it is determined whether the angular velocity information is used or the weighted constant of the angular velocity information is determined. More appropriate control can be performed by using the angular velocity information, as compared with the case in which the angular velocity information is not used. If the angular velocity is reduced, the effect obtained by using the angular velocity information is decreased, and simultaneously, the influence resulted from the error of the angular velocity information by the noise or the like is obtained. Therefore, the precision is lowered as compared with the case in which only the angle information is used. Since it is determined whether the angular velocity information is used or not, or the weighted constant of the angular velocity information is determined, by comparing the integral value of one or more times of the angular velocity information with the threshold value, the operation control of the arm can be performed which increases the effect obtained by using the angular velocity information and reduces the influence resulted from the error of the angular velocity information overall. The comparison of the integral value of one or more times of the angular velocity information with the threshold value can take the same determination criteria as the case of comparing the angular velocity information with the threshold value. It can easily treat the unit with the pivot angle information or the like in common by treating the integral value of one or more times of the angular velocity information.

APPLICATION EXAMPLE 6

In the robot according to this application example, it is preferable that a threshold value is previously set in a differential value of one or more times of the pivot angle information, and the control conversion determining unit compares the differential value of one or more times of the pivot angle information with the threshold value to determine whether the angular velocity information is used or not, or to determine the weighted constant of the angular velocity information.

According to the robot of this application example, by comparing the differential value of one or more times of the pivot angle information with the threshold value, it is determined whether the angular velocity information is used or not, or the weighted constant of the angular velocity information is determined. More appropriate control can be performed by using the angular velocity information, as compared with the case in which the angular velocity information is not used. However, in a state in which the pivot angle is increased and thus approaches the wanted angle, the angular velocity is reduced. If the angular velocity is reduced, the effect obtained by using the angular velocity information is decreased, and simultaneously, the influence resulted from the error of the angular velocity information by the noise or the like is obtained. Therefore, the precision is lowered as compared with the case in which only the angle information is used. Since it is determined whether the angular velocity information is used or not, or the weighted constant of the angular velocity information is determined, by comparing the differential value of one or more times of the angular velocity information with the threshold value, the operation control of the arm can be performed which increases the effect obtained by using the angular velocity information and reduces the influence resulted from the error of the angular velocity information overall. The comparison of the differential value of one or more times of the angular velocity information with the threshold value can take the same determination criteria as the case of comparing the pivot angle information with the threshold value. It can easily treat the unit with the angular velocity information or the like in common by treating the differential value of one or more times of the pivot angle information.

APPLICATION EXAMPLE 7

In the robot according to this application example, it is preferable that a threshold value is previously set in a time axis based on a specific point of the control command, and the control conversion determining unit compares a lapse time from the specific point with the threshold value to determine whether the angular velocity information is used or not, or to determine the weighted constant of the angular velocity information.

According to the robot of this application example, by comparing the lapse time from the specific point of the control command with the threshold value, it is determined whether the angular velocity information is used or not, or the weighted constant of the angular velocity information is determined. More appropriate control can be performed by using the angular velocity information, as compared with the case in which the angular velocity information is not used. If the angular velocity is reduced, the effect obtained by using the angular velocity information is decreased, and simultaneously, the influence resulted from the error of the angular velocity information by the noise or the like is increased. Since it is determined whether the angular velocity information is used or not or the weighted constant of the angular velocity information is determined, by comparing the lapse time from the specific point of the control command with the threshold value, the operation control of the arm can be performed which increases the effect obtained by using the angular velocity information and reduces the influence resulted from the error of the angular velocity information overall.

For example, if a predetermined time or more passes from a specific point of the control command, such as the wanted moving position, the value of the angular velocity information becomes a value of the angular velocity at the specific point defined by the control command. By comparing the lapse time from the specific point of the control command with the threshold value, it can be as the same determination criteria as the case in which the angular velocity information is compared with the threshold value. The control can be easily performed by setting the lapse time as the criteria, as compared with the case in which the angular velocity information or the like is compared with the threshold value.

APPLICATION EXAMPLE 8

In the robot according to this application example, it is preferable that a threshold value is previously set in a noise affecting the angular velocity information, and the control conversion determining unit compares the noise affecting the angular velocity information with the threshold value to determine whether the angular velocity information is used or not or to determine the weighted constant of the angular velocity information.

According to the robot of this application example, by comparing the noise affecting the angular velocity information with the threshold value, it is determined whether the angular velocity information is used or not or the weighted constant of the angular velocity information is determined. More appropriate control can be performed by using the angular velocity information, as compared with the case in which the angular velocity information is not used. If the noise affecting the angular velocity information is increased, the influence of the error in the angular velocity information due to the noise or the like is increased, and thus the effect obtained by using the angular velocity information is decreased. Since it is determined whether the angular velocity information is used or not or the weighted constant of the angular velocity information is determined, by comparing the noise affecting the angular velocity information with the threshold value, the operation control of the arm can be performed which reduces the influence resulted from the error of the angular velocity information.

APPLICATION EXAMPLE 9

A carriage device according to this application example includes a slidably supported movable unit; a driving source that moves the movable unit; a position sensor that detects a driving amount of the driving source and outputs position information of the driving source; an inertia sensor that is attached to the movable unit and outputs acceleration information of an acceleration acting on the movable unit when the movable unit is moved; a control command generating unit that outputs a control command defining movement operation of the movable unit; a control conversion determining unit that determines whether the acceleration information is used or not when the driving source is controlled to control the movement operation of the movable unit; and an operation control unit that performs a first control based on the control command, the position information, and the acceleration information, to control the driving source and thus control the movement operation of the movable unit, if the control conversion determining unit determines to use the acceleration information, and performs a second control which is different from the first control, based on the control command and the position information, to control the driving source and thus control the movement operation of the movable unit, if the control conversion determining unit determines not to use the angular velocity information.

According to the carriage device of this application example, the control conversion determining unit determines whether the acceleration information is used or not when controlling the operation of the movable unit. The operation control unit performs the first control based on the control command, the position information, and the acceleration information, and performs a second control based on the control command and the position information, in accordance with the determination of the control conversion determining unit. Therefore, in order to perform the appropriate control, the control in which the acceleration information is appropriately used or is not used can be selected, in cases in which the effect obtained by using the acceleration information is high and is low, or in cases in which the error of the acceleration information is relatively high and is relatively low. In addition, the control method which is effective by using the acceleration information can be selected and performed.

The first control is a control method of suppressing vibration or the like by using the control command, the position information and the acceleration information, and is called, for example, a state feedback control. The second control is a control method of rendering it to approach a wanted position stably by using the control command and the position information, and is, for example, a PID (Proportional Integral Differential) control based on the angle of the angle sensor or the angular velocity of its differential value, or the like.

APPLICATION EXAMPLE 10

A carriage device according to this application example includes a slidably supported movable unit; a driving source that moves the movable unit; a position sensor that detects a driving amount of the driving source and outputs position information of the driving source; an inertia sensor that is attached to the movable unit and outputs acceleration information of an acceleration acting on the movable unit when the movable unit is moved; a control command generating unit that outputs a control command defining movement operation of the movable unit; a control conversion determining unit that determines a weighted constant of the acceleration information when the driving source is controlled to control the movement operation of the movable unit; and an operation control unit that controls the driving source and thus controls the operation of the movable unit based on the control command, the position information, and the acceleration information which is multiplied by the weighted constant determined by the control conversion determining unit.

In the carriage device according to this application example, the control conversion determining unit determines the weighted constant of the acceleration information, and the operation control unit controls the movement operation of the movable unit based on the control command, the position information, and the acceleration information which is multiplied by the weighted constant determined by the control conversion determining unit. As a result, when the appropriate control is performed, since the weighted constant is determined by comprehensively considering the effect obtained by using the acceleration information and the influence resulted from the error of the acceleration information, the operation control of the movable unit can be performed which increases the effect obtained by using the acceleration information and reduces the influence resulted from the error of the acceleration information overall.

APPLICATION EXAMPLE 11

According to the carriage device of this application example, it is preferable that a threshold value is previously set in the acceleration information, and the control conversion determining unit compares the acceleration information with the threshold value to determine whether the acceleration information is used or not, or to determine the weighted constant of the acceleration information.

According to the carriage device of this application example, by comparing the acceleration information with the threshold value, it is determined whether the acceleration information is used or not, or the weighted constant of the acceleration information is determined. More appropriate control can be performed by using the acceleration information, as compared with the case in which the acceleration information is not used. However, if the acceleration is reduced, the effect obtained by using the acceleration information is decreased, and simultaneously, the influence resulted from the error of the acceleration information by the noise or the like is obtained. Therefore, the precision is lowered as compared with the case in which only the position information is used. Since it is determined whether the acceleration information is used or not, or the weighted constant of the acceleration information is determined, by comparing the acceleration information with the threshold value, the operation control of the movable unit can be performed which increases the effect obtained by using the acceleration information and reduces the influence resulted from the error of the acceleration information overall.

APPLICATION EXAMPLE 12

According to the carriage device of this application example, it is preferable that a threshold value is previously set in the position information, and the control conversion determining unit compares the position information with the threshold value to determine whether the acceleration information is used or not or to determine the weighted constant of the acceleration information.

According to the carriage device of this application example, by comparing the position information with the threshold value, it is determined whether the acceleration information is used or not, or the weighted constant of the acceleration information is determined. More appropriate control can be performed by using the acceleration information, as compared with the case in which the acceleration information is not used. However, in a state in which it moves at a constant velocity at a position as the moving amount is increased than a constant amount or a state in which it approaches the wanted position and then the moving velocity is decreased, the acceleration is reduced. If the acceleration is reduced, the effect obtained by using the acceleration is decreased, and simultaneously, the influence resulted from the error of the acceleration information by the noise or the like is obtained. Therefore, the precision is lowered as compared with the case in which only the position information is used. Since it is determined whether the acceleration information is used or not, or the weighted constant of the acceleration information is determined, by comparing the position information with the threshold value, the operation control of the movable unit can be performed which increases the effect obtained by using the acceleration information and reduces the influence resulted from the error of the acceleration information overall.

APPLICATION EXAMPLE 13

According to the carriage device of this application example, it is preferable that a threshold value is previously set in an integral value of one or more times of the acceleration information, and the control conversion determining unit compares the integral value of one or more times of the acceleration information with the threshold value to determine whether the acceleration information is used or not, or to determine the weighted constant of the acceleration information.

According to the carriage device of this application example, by comparing the integral value of one or more times of the acceleration information with the threshold value, it is determined whether the acceleration information is used or not, or the weighted constant of the acceleration information is determined. More appropriate control can be performed by using the acceleration information, as compared with the case in which the acceleration information is not used. If the acceleration is reduced, the effect obtained by using the acceleration information is decreased, and simultaneously, the influence resulted from the error of the acceleration information by the noise or the like is obtained. Therefore, the precision is lowered as compared with the case in which only the position information is used. Since it is determined whether the acceleration information is used or the weighted constant of the acceleration information is determined, by comparing the integral value of one or more times of the acceleration information with the threshold value, the operation control of the movable unit can be performed which increases the effect obtained by using the acceleration information and reduces the influence resulted from the error of the acceleration information overall. The comparison of the integral value of one or more times of the acceleration information with the threshold value can take the same determination criteria as the case of comparing the acceleration information with the threshold value. It can easily treat the unit with the position information or the like in common by treating the integral value of one or more times of the acceleration information.

APPLICATION EXAMPLE 14

According to the carriage device of this application example, it is preferable that a threshold value is previously set in a differential value of one or more times of the position information, and the control conversion determining unit compares the differential value of one or more times of the position information with the threshold value to determine whether the acceleration information is used or not or to determine the weighted constant of the acceleration information.

According to the carriage device of this application example, by comparing the differential value of one or more times of the position information with the threshold value, it is determined whether the acceleration information is used or not, or the weighted constant of the acceleration information is determined. More appropriate control can be performed by using the acceleration information, as compared with the case in which the acceleration information is not used. However, in a state in which it moves at a constant velocity at a position as the moving amount is increased than a constant amount or a state in which it approaches the wanted position and then the moving velocity is decreased, the acceleration is reduced. If the acceleration is reduced, the effect obtained by using the acceleration information is decreased, and simultaneously, the influence resulted from the error of the acceleration information by the noise or the like is obtained. Therefore, the precision is lowered as compared with the case in which only the position information is used. Since it is determined whether the acceleration information is used or not, or the weighted constant of the acceleration information is determined, by comparing the differential value of one or more times of the position information with the threshold value, the operation of the movable unit can be performed which increases the effect obtained by using the acceleration information and reduces the influence resulted from the error of the acceleration information overall. The comparison of the differential value of one or more times of the position information with the threshold value can take the same determination criteria as the case of comparing the position information with the threshold value. It can easily treat the unit with the acceleration information or the like in common by treating the differential value of one or more times of the position information.

APPLICATION EXAMPLE 15

According to the carriage device of this application example, it is preferable that a threshold value is previously set in a time axis based on a specific point of the control command, and the control conversion determining unit compares a lapse time from the specific point with the threshold value to determine whether the acceleration information is used or not, or to determine the weighted constant of the acceleration information.

According to the carriage device of this application example, by comparing the lapse time on the specific time of the control command with the threshold value, it is determined whether the acceleration information is used or not, or the weighted constant of the acceleration information is determined. More appropriate control can be performed by using the acceleration information, as compared with the case in which the acceleration information is not used. However, if the acceleration is reduced, the effect obtained by using the acceleration information is decreased, and simultaneously, the influence resulted from the error of the acceleration information by the noise or the like is obtained. Therefore, the precision is lowered as compared with the case in which only the position information is used. Since it is determined whether the acceleration information is used or not, or the weighted constant of the acceleration information is determined, by comparing the lapse time from the specific point of the control command with the threshold value, the moving operation of the movable unit can be controlled which increases the effect obtained by using the acceleration information and reduces the influence resulted from the error of the acceleration information overall.

For example, if a predetermined time or more passes from a specific point of the control command, such as the wanted position, the value of the acceleration information becomes a value of the acceleration at the specific point defined by the control command. By comparing the lapse time from the specific point of the control command with the threshold value, it can be as the same determination criteria as the case where the acceleration information is compared with the threshold value. The control can be easily performed by setting the lapse time as the criteria, as compared with the case in which the acceleration information or the like is compared with the threshold value.

APPLICATION EXAMPLE 16

According to the carriage device of this application example, it is preferable that a threshold value is previously set in a noise affecting the acceleration information, and the control conversion determining unit compares the noise affecting the acceleration information with the threshold value to determine whether the acceleration information is used or not, or to determine the weighted constant of the acceleration information.

According to the carriage device of this application example, by comparing the noise affecting the acceleration information with the threshold value, it is determined whether the acceleration information is used or not, or the weighted constant of the acceleration information is determined. More appropriate control can be performed by using the acceleration information, as compared with the case in which the acceleration information is not used. However, if the noise affecting the acceleration information is increased, the influence of the error in the acceleration information due to the noise or the like is increased, and thus the effect obtained by using the acceleration information is decreased. Since it is determined whether the acceleration information is used or not, or the weighted constant of the acceleration information is determined, by comparing the noise affecting the acceleration information with the threshold value, the moving operation of the movable unit can be controlled which reduces the influence resulted from the error of the acceleration information.

APPLICATION EXAMPLE 17

A control method using an inertia sensor according to this application example, in which a pivotally or slidably supported movable unit or a driving source that pivots or slides the movable unit is controlled by using an output of the inertia sensor which is disposed at the movable unit, includes the steps of: outputting a control command defining movement operation of the movable unit; detecting position information of the driving source; detecting inertial force information acting on the movable unit by the inertia sensor when the movable unit is moved; determining a control conversion of determining whether the inertial force information is used or not, when the driving source is controlled to control movement operation of the movable unit; and if the use of the inertial force information is determined in the step of determining the control conversion, performing a first control based on the position information, and the inertial force information to control the movement operation of the movable unit through controlling the driving source according to the control command, and if the non-use of the inertial force information is determined in the step of determining the control conversion, performing a second control which is different from the first control, based on the position information, to control the driving source according to the control command and thus control the movement operation of the movable unit.

In the control method according to this application example, in the step of determining the control conversion, the control conversion determining unit determines whether the inertial force information is used or not, or not when controlling the moving operation of the movable unit. In the drive control step, the first control is performed based on the control command, the position information, and the inertial force information, and a second control is performed based on the control command and the position information, in accordance with the determination of the step of determining the control conversion. Therefore, in order to perform the appropriate control, the control in which the inertial force information is appropriately used or is not used can be selected, in cases in which the effect obtained by using the inertial force information is high and is low, or in cases in which the error of the inertial force information is relatively high and is relatively low. In addition, the control method which is effective by using the inertial force information can be selected and performed.

The first control is a control method of suppressing vibration or the like by using the control command, the position information and the inertial force information, and is called, for example, a state feedback control. The second control is a control method of rendering it to approach a wanted position stably by using the control command and the position information, and is, for example, a PID (Proportional Integral Differential) control based on the angle of the angle sensor or the angular velocity of its differential value, or the like.

APPLICATION EXAMPLE 18

A control method using an inertia sensor according to this application example, in which a pivotally or slidably supported movable unit or a driving source that pivots or slides the movable unit is controlled by using an output of the inertia sensor which is disposed at the movable unit, includes the steps of: outputting a control command defining movement operation of the movable unit; detecting a driving amount of the driving source and detecting position information of the driving source; detecting inertial force information acting on the movable unit by the inertia sensor when the movable unit is moved; determining a weighted constant of the inertial force information, when the driving source is controlled by using the inertial force information to control movement operation of the movable unit; and controlling the movement operation of the movable unit by controlling the driving source using the control command, the position information, and the inertial force information which is multiplied by the weighted constant determined in the step of determining the weighted constant.

In the control method according to this application example, in the step of determining the constant, the weighted constant of the inertial force information is determined, and in the driving control step, the moving operation of the movable unit is controlled based on the control command, the position information, and the inertial force information which is multiplied by the weighted constant determined by the control conversion determining unit. As a result, when the appropriate control is performed, since the weighted constant is determined by comprehensively considering the influence obtained by using the inertial force information and the influence resulted from the error of the inertial force information, the moving operation of the movable unit can be performed which increases the effect obtained by using the inertial force information and reduces the influence resulted from the error of the inertial force information overall.

APPLICATION EXAMPLE 19

According to the control method of this application example, it is preferable that the step of determining the control conversion or the step of determining the weighted constant is a step of determining whether the inertial force information is used or not, or determining the weighted constant of the inertial force information by comparing the inertial force information with a threshold value which is previously set with respect to the inertial force information.

According to the control method using the inertial force of this application example, in the step of determining the control conversion or the step of determining the weighted constant, by comparing the inertial force information with the threshold value, it is determined whether the inertial force information is used or not, or the weighted constant of the inertial force information is determined. More appropriate control can be performed by using the inertial force information, as compared with the case in which the inertial force information is not used. However, if the inertial force is reduced, the effect obtained by using the inertial force information is decreased, and simultaneously, the influence resulted from the error of the inertial force information by the noise or the like is obtained. Therefore, the precision is lowered as compared with the case in which only the position information is used. Since it is determined whether the inertial force information is used or not, or the weighted constant of the inertial force information is determined, by comparing the inertial force information with the threshold value, the operation of the movable unit can be performed which increases the effect obtained by using the inertial force information and reduces the influence resulted from the error of the inertial force information overall.

APPLICATION EXAMPLE 20

According to the control method using the inertial force of this application example, it is preferable that the step of determining the control conversion or the step of determining the weighted constant is a step of determining whether the inertial force information is used or not, or determining the weighted constant of the inertial force information by comparing the position information with a threshold value which is previously set with respect to the position information.

According to the control method by using the inertial force of this application example, by comparing the position information with the threshold value, it is determined whether the inertial force information is used or not, or the weighted constant of the inertial force information is determined. More appropriate control can be performed by using the inertial force information, as compared with the case in which the inertial force information is not used. However, in a state in which it moves at a constant velocity at a position as the moving amount is increased than a constant amount or a state in which it approaches the wanted position and then the moving velocity is decreased, the inertial force is reduced. If the inertial force is reduced, the effect obtained by using the inertial force information is decreased, and simultaneously, the influence resulted from the error of the inertial force information by the noise or the like is obtained. Therefore, the precision is lowered as compared with the case in which only the position information is used. Since it is determined whether the inertial force information is used or not, or the weighted constant of the inertial force information is determined, by comparing the position information with the threshold value, the moving operation of the movable unit can be controlled which increases the effect obtained by using the inertial force information and reduces the influence resulted from the error of the inertial force information overall.

APPLICATION EXAMPLE 21

According to the control method using the inertial force of this application example, it is preferable that the step of determining the control conversion or the step of determining the weighted constant is a step of determining whether the inertial force information is used or not, or determining the weighted constant of the inertial force information by comparing an integral value of one or more times of the inertial force information with a threshold value which is previously set with respect to the integral value of one or more times of the inertial force information.

According to the control method using the inertial force of this application example, in the step of determining the control conversion or determining the weighted constant, by comparing the integral value of one or more times of the inertial force information with the threshold value, it is determined whether the inertial force information is used or not, or the weighted constant of the inertial force information is determined. More appropriate control can be performed by using the inertial force information, as compared with the case in which the inertial force information is not used. However, if the inertial force is reduced, the effect obtained by using the inertial force information is decreased, and simultaneously, the influence resulted from the error of the inertial force information by the noise or the like is obtained. Therefore, the precision is lowered as compared with the case in which only the position information is used. Since it is determined whether the inertial force information is used or not, or the weighted constant of the inertial force information is determined, by comparing the integral value of one or more times of the inertial force information with the threshold value, the moving operation of the movable unit can be controlled which increases the effect obtained by using the inertial force information and reduces the influence resulted from the error of the inertial force information overall. The comparison of the integral value of one or more times of the inertial force information with the threshold value can take the same determination criteria as the case of comparing the inertial force information with the threshold value. It can easily treat the unit with the position information or the like in common by treating the integral value of one or more times of the inertial force information.

APPLICATION EXAMPLE 22

According to the control method using the inertial force of this application example, it is preferable that the step of determining the control conversion or the step of determining the weighted constant is a step of determining whether the inertial force information is used or not, or determining the weighted constant of the inertial force information by comparing a differential value of one or more times of the position information with a threshold value which is previously set with respect to the differential value of one or more times of the position information.

According to the control method using the inertial force of this application example, in the step of determining the control conversion, by comparing the differential value of one or more times of the position information with the threshold value, it is determined whether the inertial force information is used or not, or the weighted constant of the inertial force information is determined. More appropriate control can be performed by using the inertial force information, as compared with the case in which the inertial force information is not used. However, in a state in which it moves at a constant velocity at a position as the moving amount is increased than a constant amount or a state in which it approaches the wanted position and then the moving velocity is decreased, the inertial force is reduced. If the inertial force is reduced, the effect obtained by using the inertial force information is decreased, and simultaneously, the influence resulted from the error of the inertial force information by the noise or the like is obtained. Therefore, the precision is lowered as compared with the case in which only the position information is used. Since it is determined whether the inertial force information is used or not, or the weighted constant of the inertial force information is determined, by comparing the differential value of one or more times of the position information with the threshold value, the moving operation of the movable unit can be controlled which increases the effect obtained by using the inertial force information and reduces the influence resulted from the error of the inertial force information overall. The comparison of the differential value of one or more times of the inertial force information with the threshold value can take the same determination criteria as the case of comparing the position information with the threshold value. It can easily treat the unit with the inertial force information or the like in common by treating the differential value of one or more times of the position information.

APPLICATION EXAMPLE 23

According to the control method using the inertial force of this application example, it is preferable that the step of determining the control conversion or the step of determining the weighted constant is a step of determining whether the inertial force information is used or not, or determining the weighted constant of the inertial force information by comparing a lapse time from a specific point of the control command with the threshold value which is previously set in a time axis based on the specific point of the control command.

According to the control method using the inertial force of this application example, by comparing a lapse time from a specific point of the control command with the threshold value, it is determined whether the inertial force information is used or not, or the weighted constant of the inertial force information is determined. More appropriate control can be performed by using the inertial force information, as compared with the case in which the inertial force information is not used. However, if the inertial force is reduced, the effect obtained by using the inertial force information is decreased, and simultaneously, the influence resulted from the error of the inertial force information by the noise or the like is obtained. Therefore, the precision is lowered as compared with the case in which only the position information is used. Since it is determined whether the inertial force information is used or not, or the weighted constant of the inertial force information is determined, by comparing the lapse time from the specific point of the control command with the threshold value, the moving operation of the movable unit can be controlled which increases the effect obtained by using the inertial force information and reduces the influence resulted from the error of the inertial force information overall.

For example, if a predetermined time or more passes from a specific point of the control command, such as the wanted moving position, the value of the inertial force information becomes a value of the inertial force at the specific point defined by the control command. By comparing the lapse time from the specific point of the control command with the threshold value, it can be as the same determination criteria as the case in which the inertial force information is compared with the threshold value. The control can be easily performed by setting the lapse time as the criteria, as compared with the case in which the inertial force information or the like is compared with the threshold value.

APPLICATION EXAMPLE 24

According to the control method using the inertial force of this application example, it is preferable that the step of determining the control conversion or the step of determining the weighted constant is a step of determining whether the inertial force information is used or not, or determining the weighted constant of the inertial force information by comparing a noise affecting the inertial force information with the threshold value which is previously set in the noise affecting the inertial force information.

According to the control method using the inertial force of this application example, in the step of determining the control conversion or the step of determining the weighed constant, it is determined whether the inertial force information is used or not, or the weighted constant of the inertial force information is determined by comparing the noise affecting the inertial force information with the threshold value. More appropriate control can be performed by using the inertial force information, as compared with the case in which the inertial force information is not used. However, if the noise affecting the inertial force information is increased, the influence of the error in the inertial force information due to the noise or the like is increased, and thus the effect obtained by using the inertial force information is decreased. Since it is determined whether the inertial force information is used or not, or the weighted constant of the inertial force information is determined, by comparing the noise affecting the inertial force information with the threshold value, the moving operation of the movable unit can be controlled which reduces the influence resulted from the error of the inertial force information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
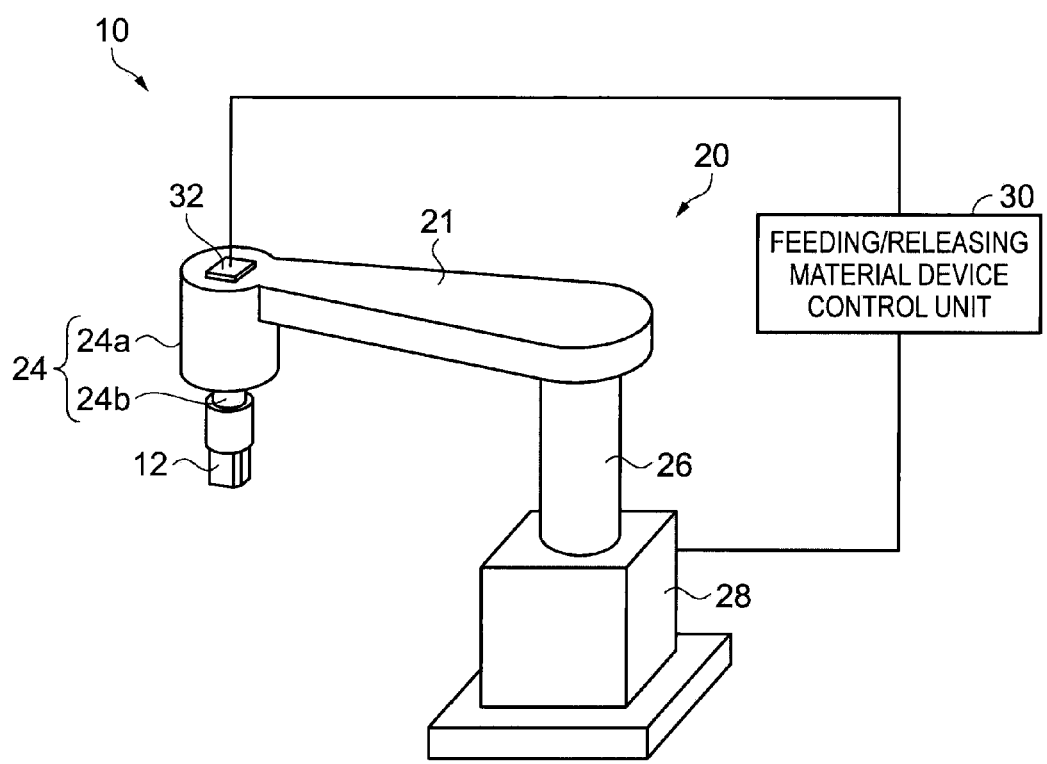
FIG. 1 is a perspective view schematically illustrating the external configuration of a feeding/releasing material device.

Next, one example of a robot, a carriage device and a control method using an inertia sensor will be described with reference to the drawings. In the drawings referred in the following description, there is a case in which a vertical or horizontal scale of a member or portion or a scale for every portion is represented differently from a real scale in order to easily understand a constituent member.

Embodiment 1

A first embodiment of a robot, a carriage device and a control method using an inertia sensor will now be described. In this embodiment, a feeding/releasing material device which is an example of the carriage device will be described by way of an example. For example, in a process of fabricating a semiconductor device, the feeding/releasing material device of the embodiment is a feeding/releasing material device capable of treating a wafer on which a plurality of semiconductor chips constituting a semiconductor device is compartment-formed.

Feeding/Releasing Material Device

First, the mechanical configuration of a feeding/releasing material device 10 will be described with reference to FIG. 1. FIG. 1 is a perspective view schematically illustrating an external configuration of the feeding/releasing material device.

Figure 2:
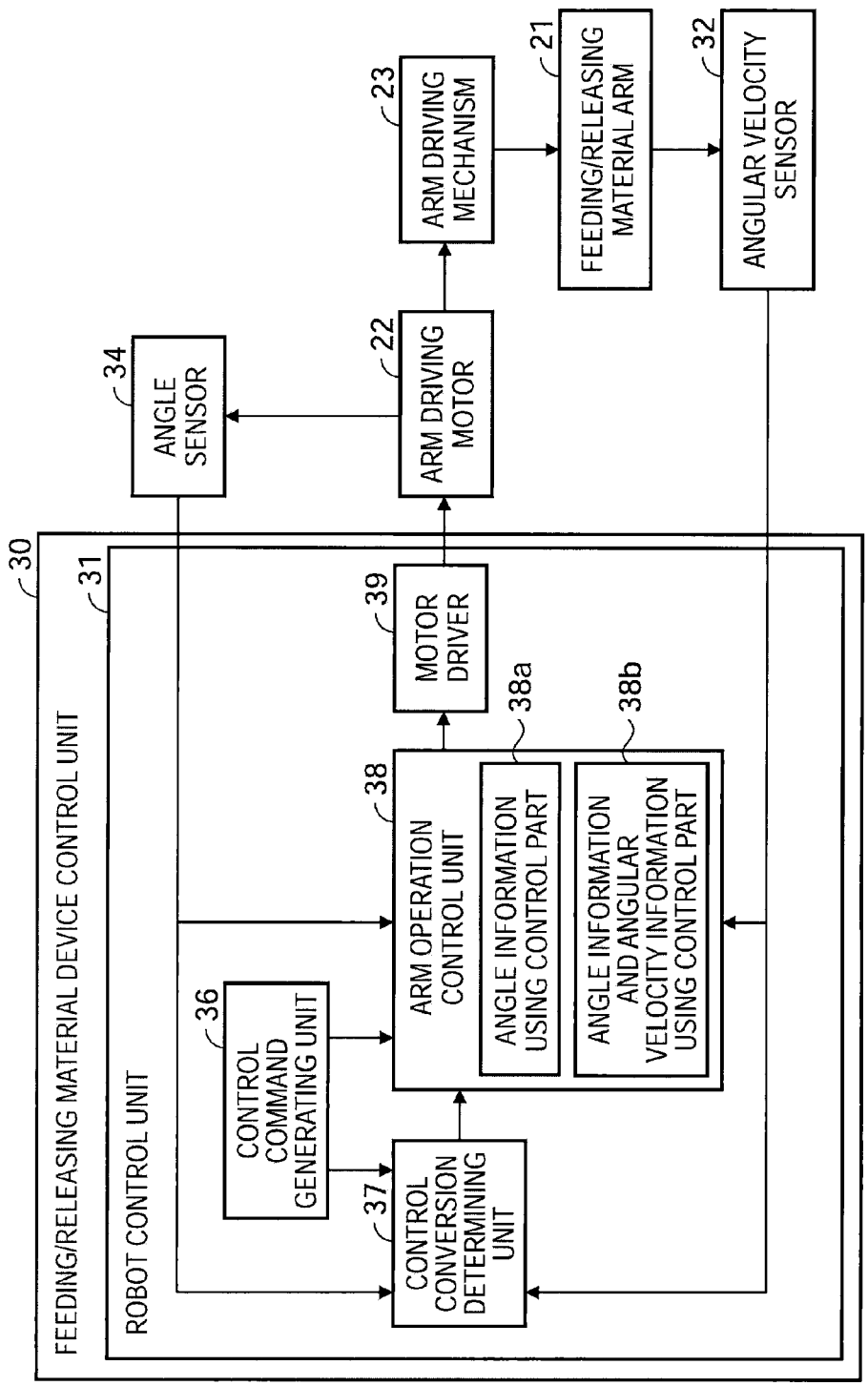
FIG. 2 is a block diagram illustrating a functional configuration of driving a robot mechanism.

As shown in FIG. 1, the feeding/releasing material device 10 includes a holding hand 12, a robot mechanism 20, a feeding/releasing material device control unit 30, an angular velocity sensor 32, and an angle sensor 34 (refer to FIG. 2).

The robot mechanism 20 includes a hand holding mechanism 24, a feeding/releasing material arm 21, an arm shaft part 26, and a base 28. The base 28 supports the arm shaft part 26 in such a way that the arm shaft part can be rotated around a rotational shaft of the arm shaft part 26 via a built-in bearing mechanism (not illustrated) and can be precisely positioned. The arm shaft part 26 is connected to the arm driving motor 22 (refer to FIG. 2) built in the base 28 via an arm driving mechanism 23 (refer to FIG. 2), and thus is pivoted by the arm driving motor 22. The arm driving motor 22 is connected to the angle sensor 34, and a pivot angle of the arm driving motor 22 is measured by the angle sensor 34.

An end portion of the arm shaft part 26 which is opposite to its end portion supported by the base 28 is fixed to one end portion of the feeding/releasing material arm 21. The feeding/releasing material arm 21 is pivoted around the rotational shaft of the arm shaft part 26 by the arm driving motor 22. The pivot angle of the feeding/releasing material arm 21 is approximately measured by measuring the pivot angle of the arm driving motor 22 using the angle sensor 34.

The hand holding mechanism 24 is fixed to the end portion of the arm shaft part 26 which is opposite to its end portion supported by the base 28. The hand holding mechanism 24 has a holding bearing 24a fixed to the feeding/releasing material arm 21, and a holding mechanism shaft 24b which can be slidably supported and precisely positioned on the holding bearing 24a. The holding mechanism shaft 24b can be slidably supported with respect to the holding bearing 24a in an axial direction of the holding mechanism shaft 24b by a vertically driving source (not illustrated). The axial direction of the holding mechanism shaft 24b is substantially parallel with the axial direction of the arm shaft part 26.

A holding hand 12 is attached to a free end of the holding mechanism shaft 24b. The holding hand 12 is located at a position faced to an object to be carried by pivoting the feeding/releasing material arm 21. By sliding the holding mechanism shaft 24b with respect to the holding bearing 24a, the holding hand 12 is separated from and connected to the object to be carried, and simultaneously, the object to be carried which is held by the holding hand 12 is lifted from a placing location or is drawn close to the placing location.

The angular velocity sensor 32 is fixed at a side opposite to the holding hand 12 to the hand holding mechanism 24 attached with the holding hand 12. That is, the angular velocity sensor 32 is fixed to a front end of the feeding/releasing material arm 21 to measure an angular velocity of the feeding/releasing material arm 21 to be pivoted.

The feeding/releasing material device control unit 30 wholly controls the operation of each part of the feeding/releasing material device 10 based on a control program previously put via an information input/output device (not illustrated).

Functional Configuration of Robot Mechanism Drive

Next, the functional configuration of driving the robot mechanism 20 will be described with reference to FIG. 2. FIG. 2 is a block diagram illustrating the functional configuration of driving the robot mechanism.

As described above, the feeding/releasing material device 10 includes the arm driving motor 22, the arm driving mechanism 23, the angular velocity sensor 32, the angle sensor 34, and the feeding/releasing material device control unit 30 in order to pivot the feeding/releasing material arm 21.

As the angular velocity sensor 32, for example, a gyro sensor may be used. As the angle sensor 34, for example, an encoder may be used. The feeding/releasing material arm 21 corresponds to an arm, the robot mechanism 20 corresponds to a robot, the arm driving motor 22 corresponds to a driving source, and the angular velocity sensor 32 corresponds to an inertia sensor.

As shown in FIG. 2, the feeding/releasing material device control unit 30 includes a robot controller 31 for controlling the arm driving motor 22. The robot controller 31 has a control command generating part 36, a control conversion determining part 37, an arm operation control part 38, and a motor driver 39.

The control command generating part 36 outputs an operation command for the feeding/releasing material arm 21 so as to execute the operation command of the robot mechanism 20 based on an operation command of feeding or releasing a material. The operation command is input to the feeding/releasing material device 10 from an input device (not illustrated). The operation command of the robot mechanism 20 based on the operation command is output to the control command generating part 36 from an overall control part (not illustrated) provided in the feeding/releasing material device control unit 30. The operation command of the feeding/releasing material arm 21 which is output from the control command generating part 36, for example, a trace of the front end of the feeding/releasing material arm 21 is commanded as an angle of the feeding/releasing material arm 21 every time.

The arm operation control part 38 outputs a control signal of the arm driving motor 22 to execute the operation command of the feeding/releasing material arm 21 which is output from the control command generating part 36. The arm operation control part 38 has angle information using control part 38a and an angle information and angular velocity information using control part 38b. The angle information using control part 38a generates and outputs an optimum control signal of the arm driving motor 22 in accordance with the angle information from the angle sensor 34 so as to execute the operation command of the feeding/releasing material arm 21. The angle information and angular velocity information using control part 38b generates and outputs an optimum control signal of the arm driving motor 22 in accordance with the angle information from the angle sensor 34 and the angular velocity information from the angular velocity sensor 32 so as to execute the operation command of the feeding/releasing material arm 21. The conversion of the angle information using control part 38a and the angle information and angular velocity information using control part 38b is determined by the control conversion determining part 37. The angle information using control part 38a and the angle information and angular velocity information using control part 38b may install a dedicated hardware, respectively, or a single hardware may be used as the angle information using control part 38a or the angle information and angular velocity information using control part 38b by a control program. The arm operation control part 38, or the angle information using control part 38a and the angle information and angular velocity information using control part 38b provided in the arm operation control part 38 correspond to the arm operation control unit.

The control conversion determining part 37 selects and determines the use of the angle information using control part 38a or the angle information and angular velocity information using control part 38b. The control conversion determining part 37 selects and determines the use of the angle information using control part 38a or the angle information and angular velocity information using control part 38b in accordance with the angle information from the angle sensor 34, the angular velocity information from the angular velocity sensor 32, or the operation command of the feeding/releasing material arm 21 from the control command generating part 36.

Pivot of Feeding/Releasing Material Arm 21

Figure 3:
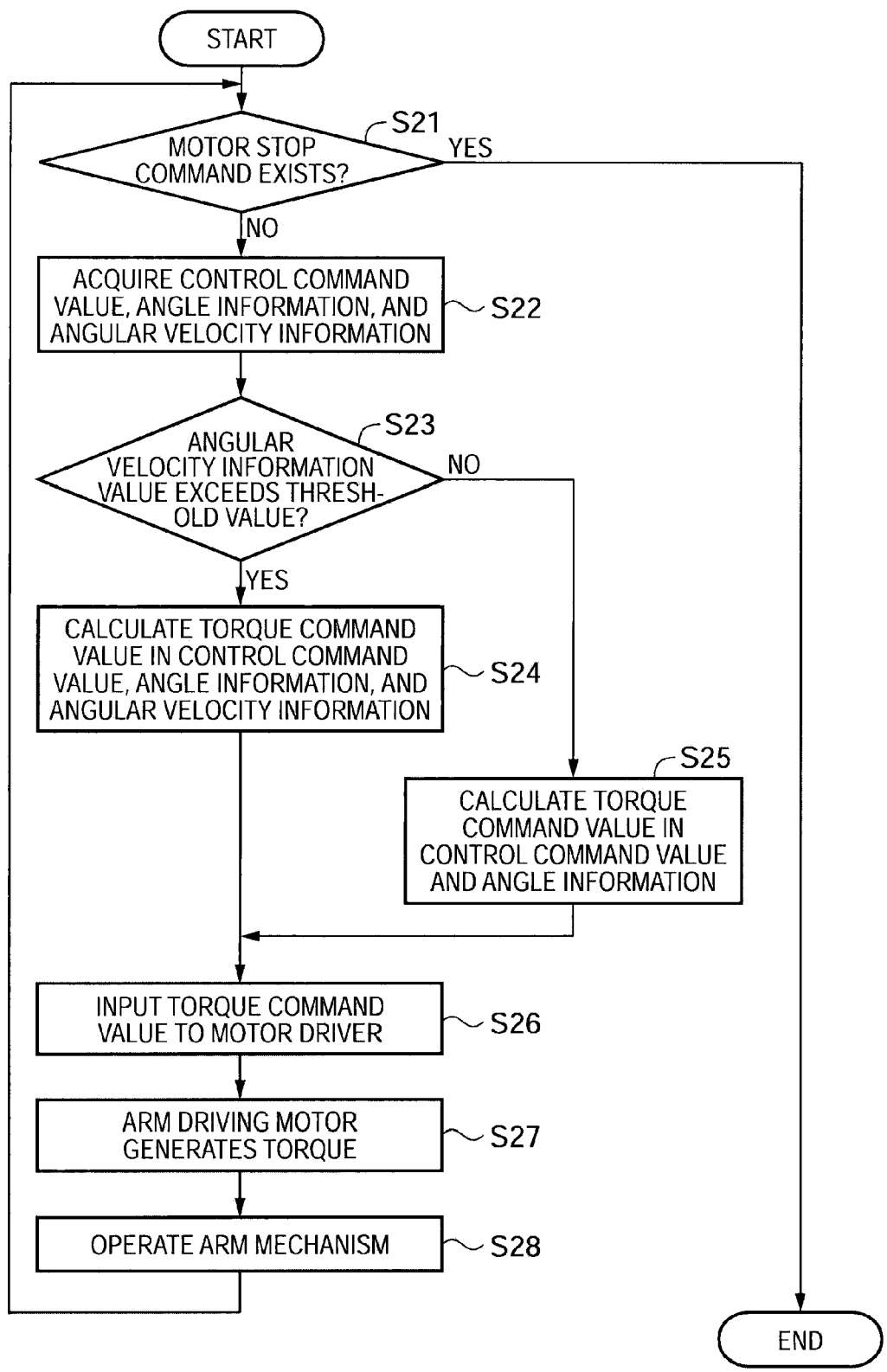
FIG. 3 is a flowchart illustrating a process of pivoting a feeding/releasing material arm by controlling a drive of an arm driving motor.
Figure 4A:
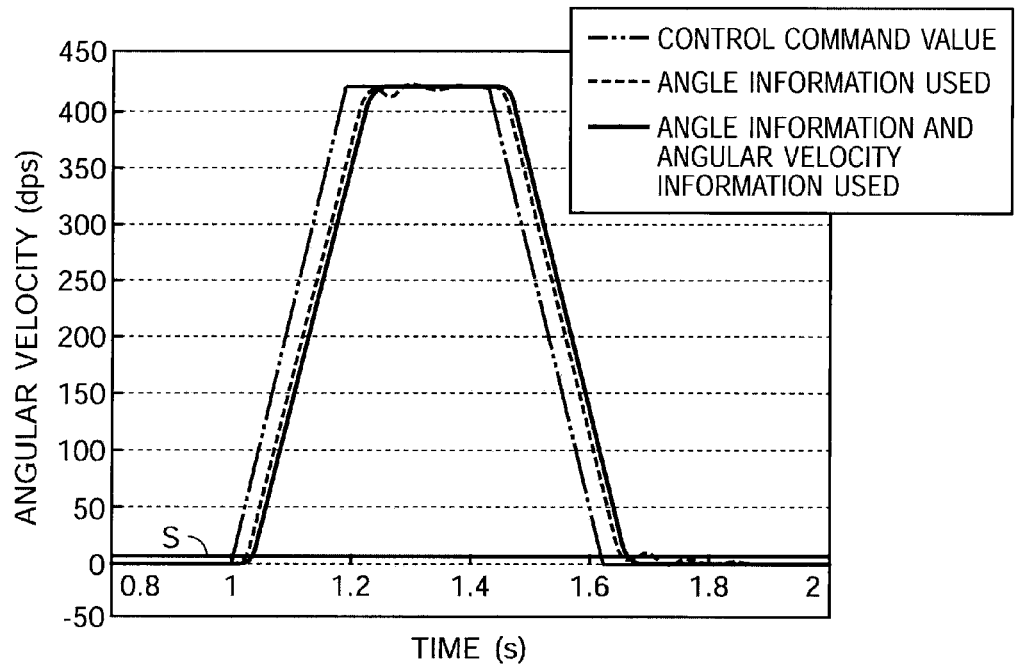
FIG. 4A is a diagram illustrating an example of a relationship between a time lapse and an angular velocity, and a threshold value of the angular velocity while a feeding/releasing material arm is pivoted.
Figure 4B:
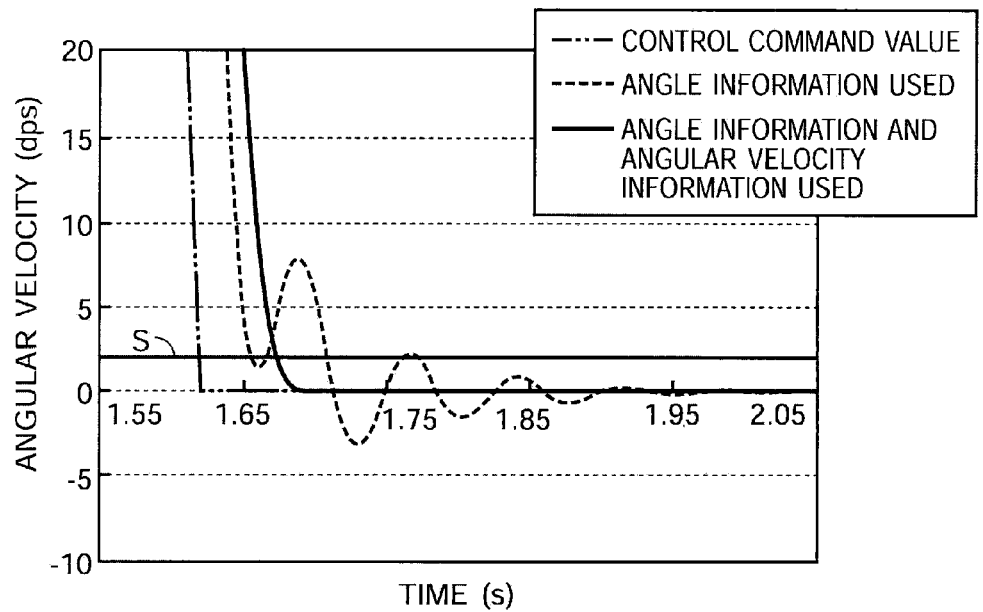
FIG. 4B is a diagram illustrating an example of a relationship between a time lapse and an angular velocity, and a threshold value of the angular velocity while a feeding/releasing material arm is stopped.

Next, the process of positioning the holding hand 12 which is installed at the front end of the feeding/releasing material arm 21, at an appropriate position by controlling the drive of the arm driving motor 22 and pivoting the feeding/releasing material arm 21 will be described with reference to FIGS. 3 and 4. FIG. 3 is a flowchart illustrating the process of pivoting the feeding/releasing material arm by controlling the drive of the arm driving motor. FIGS. 4A and 4B are explanatory views illustrating an example of a threshold value of the angular velocity as a standard of converting the control. FIG. 4A is a diagram illustrating an example of a relationship between a time lapse and an angular velocity, and a threshold value of the angular velocity while the feeding/releasing material arm is pivoted. FIG. 4B is a diagram illustrating an example of a relationship between a time lapse and an angular velocity, and a threshold value of the angular velocity while the feeding/releasing material arm is stopped.

First, in a step S21 in FIG. 3, it is determined whether there is a motor stop command or not. The motor stop command is a command of stopping the arm driving motor 22 to complete the control.

If there is the motor stop command (YES in step S21), the feeding/releasing material arm 21 is pivoted by controlling the drive of the arm driving motor 22 to complete the process of positioning the holding hand 12 which is located at the front end of the feeding/releasing material arm 21, at the appropriate position.

If there is no motor stop command (NO in step S21), it proceeds to step S22.

Next, in step S22, the control command values, the angle information, and the angular velocity information are obtained. More specifically, the control command value output from the control command generating part 36 and input to the arm operation control part 38 is input to the control conversion determining part 37. The angle information on the pivot angle of the feeding/releasing material arm 21 which is obtained from the pivot angle of the arm driving motor 22 measured by the angle sensor 34 connected to the arm driving motor 22 is input to the control conversion determining part and the arm operation control part 38. The angular velocity information on the angular velocity of the feeding/releasing material arm 21 which is measured by the angular velocity sensor 32 fixed near to the front end of the feeding/releasing material arm 21 is input to the control conversion determining part 37 and the arm operation control part 38.

Next, in step S23, the control conversion determining part 37 determines whether the angular velocity of the feeding/releasing material arm 21 is more than a predetermined threshold value or not based on the angular velocity information output from the angular velocity sensor 32. The predetermined threshold value is indicated by a threshold value S.

If the angular velocity of the feeding/releasing material arm 21 is more than the predetermined threshold value S (YES in step S23), the control conversion determining part determines to use the angle information and angular velocity information using control part 38b, and it proceeds to step S24.

In step S24, the angle information and angular velocity information using control part 38b calculates a torque command value from the control command value, the angle information, and the angular velocity information.

If the angular velocity of the feeding/releasing material arm 21 is less than the predetermined threshold value S (NO in step S23), the control conversion determining part 37 determines to use the angle information using control part 38a, and it proceeds to step S25.

In step S25, the angle information using control part 38a calculates a torque command value from the control command value, and the angle information.

As shown FIG. 4A, in a step in which the feeding/releasing material arm 21 starts to pivot and the angular velocity is less than the threshold value S and a step in which it approaches the target position and the angular velocity is less than the threshold value S, the angular velocity information is not used, and the control is performed by using the control command value and the angle information. The control utilizes a PID (Proportional Integral Differential) control based on, for example, the angle of the angle sensor or the angular velocity of its differential value. In this instance, the PID control or the like corresponds to the second control.

At a step in which the angular velocity is higher than the threshold value S in the middle of the pivoting motion, the control is performed by utilizing the angular velocity information, the control command value and the angle information. The control utilizes a control method, for example, a so-called state feedback control. In this instance, the state feedback control or the like corresponds to the first control.

The angular velocity indicated by a double-dotted chain line in FIGS. 4A and 4B is an angular velocity designated for every lapse time as the control command value. The angular velocity indicated by a broken line in FIGS. 4A and 4B is an example of an angular velocity for every lapse time in the case where the PID control is performed based on the angle of the angle sensor using the control command value and the angle information, or the angular velocity of its differential value. The angular velocity indicated by the solid line in FIGS. 4A and 4B is an example of an angular velocity for every lapse time in the case where the state feedback control or the like is performed by using the control command value, the angular velocity information and the angle information.

In this instance, FIGS. 4A and 4B show the solid line indicating the angular velocity in the case of performing the state feedback control or the like at a slow side in time in order to apparently separate the broken line indicating the angular velocity in the case of performing the PID control from the solid line indicating the angular velocity in the case of performing the state feedback control or the like.

Subsequent to step S24 or step S25, the torque command value calculated and obtained by the angle information using control part 38a or the angle information and angular velocity information using control part 38b is input to the motor driver 39 in step S26.

Next, in step S27, electric power corresponding to the torque command value is supplied to the arm driving motor 22 by the motor driver 39. The arm driving motor 22 generates a torque corresponding to the supplied electric power.

Then, in step S28, the arm driving mechanism 23 connected to the arm driving motor 22 is operated by the torque generated by the arm driving motor 22, and the angular velocity of the feeding/releasing material arm 21 connected to the arm driving motor 22 via the arm driving mechanism 23 is accelerated or decelerated by the torque generated by the arm driving motor 22.

Subsequent to step S28, it proceeds to step S21, and in a case in which there is the motor stop command in step S21 (YES in step S21), the feeding/releasing material arm 21 is pivoted by controlling the drive of the arm driving motor 22 to complete the process of positioning the holding hand 12, which is installed at the front end of the feeding/releasing material arm 21, at a predetermined position.

As shown in FIG. 4B, in the case in which the control using the control command value and the angle information is performed, residual vibration may be generated by pivoting the feeding/releasing material arm 21 so as to return the holding hand 12 passing through the wanted position. By generation of the residual vibration, a time is required until the feeding/releasing material arm 21 stops after it almost reaches the wanted position, that is, the residual vibration stabilized.

In the case in which the control using the control command value, the angular velocity information and the angle information is performed, the vibration is almost not generated. As a result, until the feeding/releasing material arm 21 almost approaches the wanted position and then is stopped, the time is not required. In the case in which the noise is carried in the angular velocity information, since the vibration is generated by the noise, the precision is deteriorated. It is possible to exclude the influence of the noise by increasing the threshold value of the angular velocity converting the control than the angular velocity of the vibration resulted from the noise. By converting the control using the control command value and the angle information, it is possible to suppress the generation of heavy vibration in comparison with the case of using the angular velocity information including the noise.

In addition, by lowering the threshold value of the angular velocity converting the control to less than the maximum angular velocity of the residual vibration in the case in which the control using the control command value and the angle information is performed, it is possible to suppress the vibration from generating when the control using the control command value, the angular velocity information and the angle information is performed prior to the time converting the control. For this reason, in comparison with a case of performing the control using the control command value and the angle information without performing the control using the control command value, the angular velocity information and the angle information, because the maximum angular velocity of the residual vibration is lowered, it is possible to decrease the time until the residual vibration stabilized.

Embodiment 2

A second embodiment of a robot, a carriage device and a control method using an inertia sensor will now be described. In this embodiment, a feeding/releasing material device 210 which is an example of the carriage device includes substantially the same mechanical configuration as that of the feeding/releasing material device 10 which is described by reference to FIG. 1 in the first embodiment. The functional configuration of the robot mechanism drive and the process of pivoting a feeding/releasing material arm 21, which are different from a part of the feeding/releasing material device 10, will be described.

Functional Configuration of Robot Mechanism Drive

Figure 5:
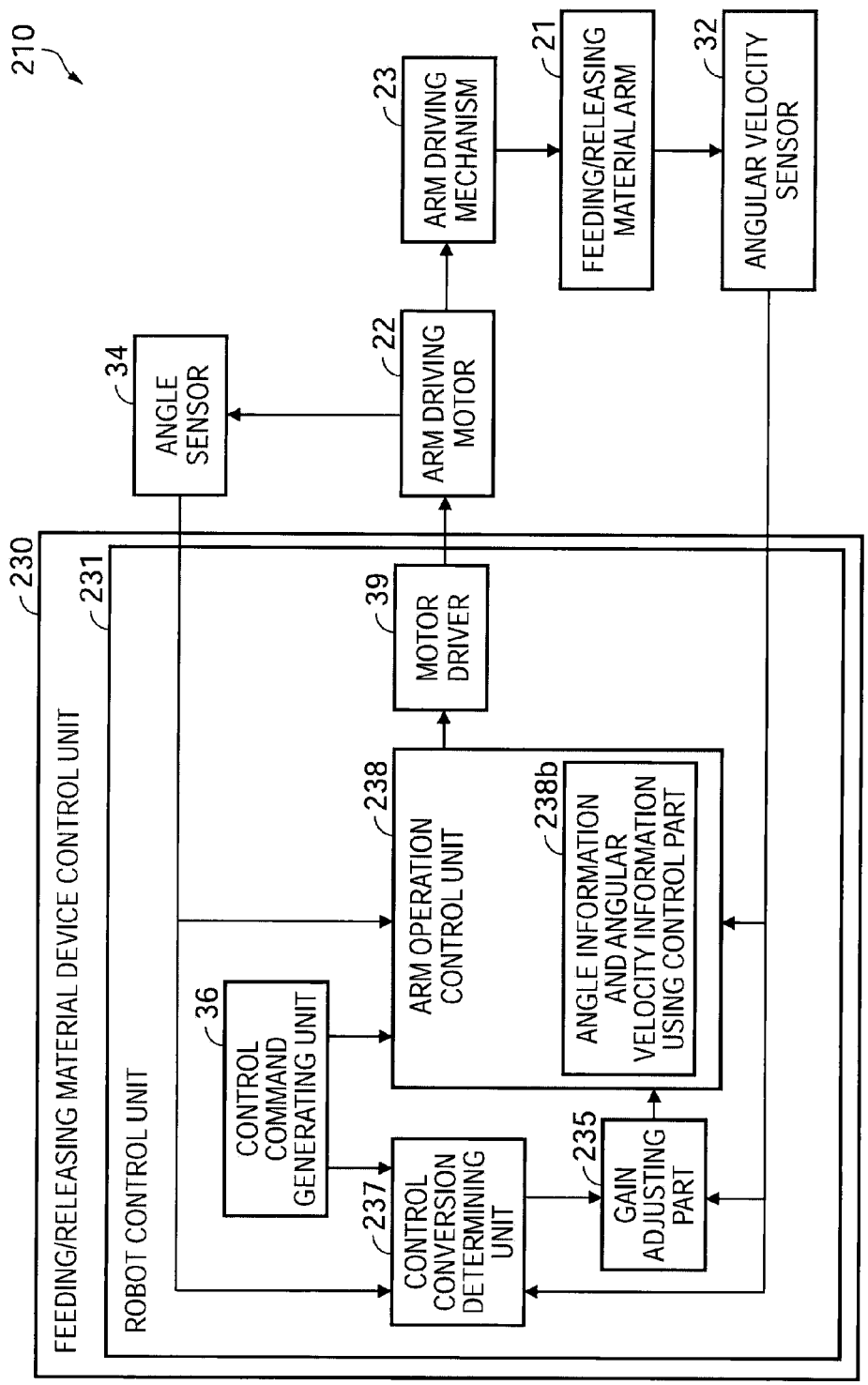
FIG. 5 is a block diagram illustrating a functional configuration of driving a robot mechanism.

First, the functional configuration of driving the robot mechanism 20 in the feeding/releasing material device 210 according to the embodiment will be described with reference to FIG. 5. FIG. 5 is a block diagram illustrating the functional configuration of driving the robot mechanism.

Similar to the feeding/releasing material device 10, the feeding/releasing material device 210 includes an arm driving motor 22, an arm driving mechanism 23, an angular velocity sensor 32, an angle sensor 34, and a feeding/releasing material device control unit 230 in order to pivot a feeding/releasing material arm 21.

As shown in FIG. 5, the feeding/releasing material device control unit 230 includes a robot controller 231 for controlling the arm driving motor 22. The robot controller 231 has a control command generating part 36, a control conversion determining part 237, an arm operation control part 238, a gain adjusting part 235, and a motor driver 39.

The control command generating part 36 outputs an operation command for the feeding/releasing material arm 21 so as to execute the operation command of the robot mechanism 20 based on an operation command of feeding or releasing a material. The operation command is input to the feeding/releasing material device 210 from an input device (not illustrated). The operation command of the robot mechanism 20 based on the operation command is output to the control command generating part 36 from an overall control part (not illustrated) provided in the feeding/releasing material device control unit 230. The operation command of the feeding/releasing material arm 21 which is output from the control command generating part 36, for example, a trace of the front end of the feeding/releasing material arm 21 is commanded as an angle of the feeding/releasing material arm 21 every time.

The arm operation control part 238 outputs a control signal of the arm driving motor 22 to execute the operation command of the feeding/releasing material arm 21 which is output from the control command generating part 36. The arm operation control part 238 has an angle information and angular velocity information using control part 238b. The angle information and angular velocity information using control part 238b generates and outputs an optimum control signal of the arm driving motor 22 in accordance with the angle information from the angle sensor 34 and the angular velocity information from the angular velocity sensor 32 so as to execute the operation command of the feeding/releasing material arm 21. The gain adjusting part 235 adjusts and outputs a gain of the angular velocity information when angle information and angular velocity information using control part 238b generates the control signal of the arm driving motor 22 in accordance with the angle information and the angular velocity information. The conversion of the gain of the angular velocity information is determined by the control conversion determining part 237. In this instance, the gain adjusting part 235 and the control conversion determining part 237 correspond to the control conversion determining part.

The gain of the angular velocity information corresponds to a weighted constant of the inertial force information. The arm operation control part 238 or the angle information and angular velocity information using control part 238b provided in the arm operation control part 238 corresponds to the arm operation control part.

The control conversion determining part 237 determines the conversion of the gain of the angular velocity information in accordance with the angle information from the angle sensor 34, the angular velocity information from the angular velocity sensor 32, or the operation command of the feeding/releasing material arm 21 from the control command generating part 36.

Pivot of Feeding/Releasing Material Arm 21

Figure 6:
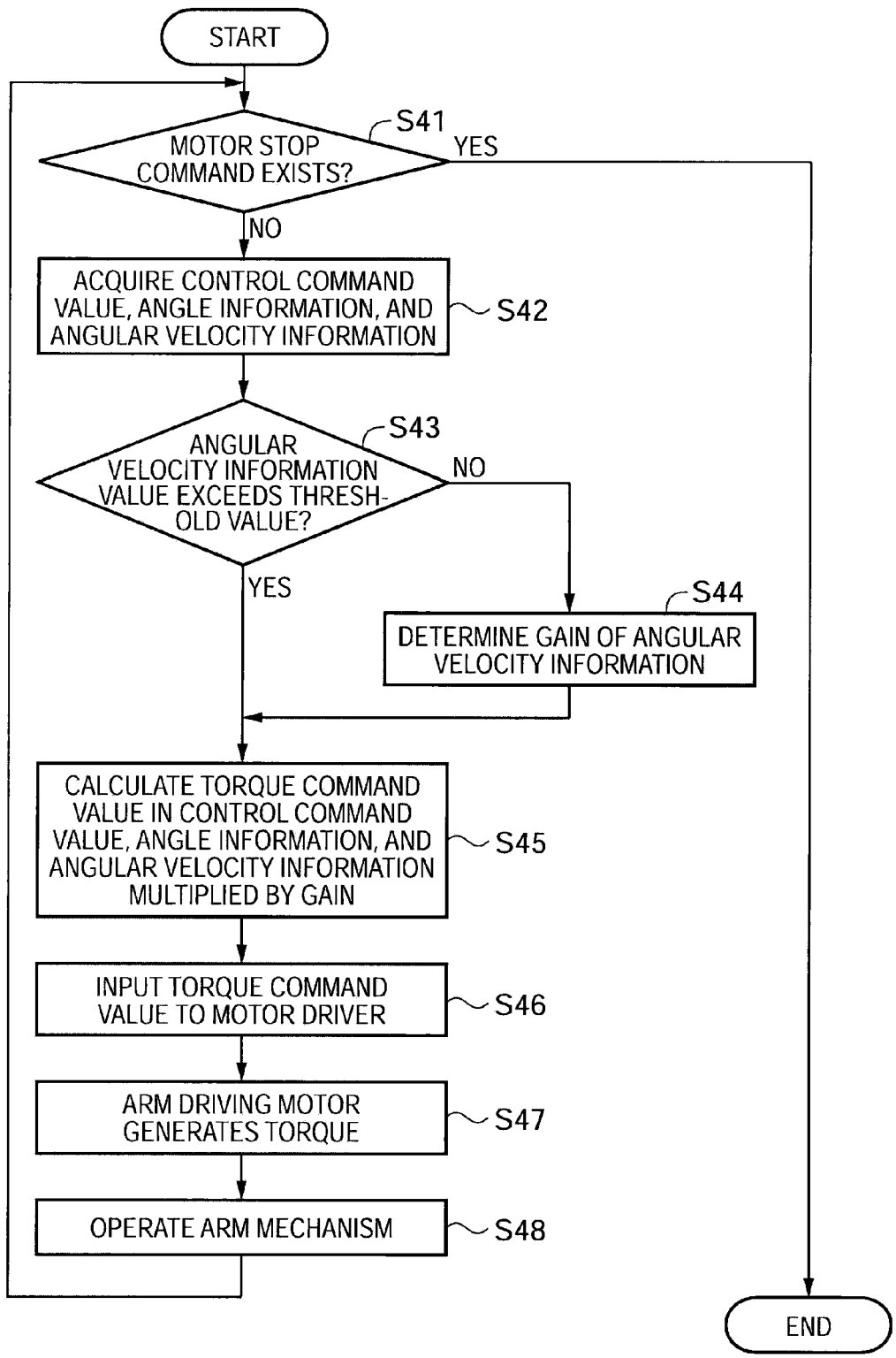
FIG. 6 is a flowchart illustrating a process of pivoting a feeding/releasing material arm by controlling a drive of an arm driving motor.

Next, in the feeding/releasing material device 210, the process of positioning the holding hand 12 which is installed at the front end of the feeding/releasing material arm 21, at an appropriate position by controlling the drive of the arm driving motor 22 and pivoting the feeding/releasing material arm 21 will be described with reference to FIG. 6. FIG. 6 is a flowchart illustrating the process of pivoting the feeding/releasing material arm by controlling the drive of the arm driving motor.

First, in a step S41 in FIG. 6, it is determined whether there is a "motor stop command" or not. The motor stop command is a command of stopping the arm driving motor 22 to complete the control.

If there is the motor stop command (YES in step S41), the feeding/releasing material arm 21 is pivoted by controlling the drive of the arm driving motor 22 to complete the process of positioning the holding hand 12 which is located at the front end of the feeding/releasing material arm 21, at the appropriate position.

If there is no motor stop command (NO in step S41), it proceeds to step S42.

Next, in step S42, the control command values, the angle information, and the angular velocity information are obtained. More specifically, the control command value output from the control command generating part 36 and input to the arm operation control part 238 is input to the control conversion determining part 237. The angle information on the pivot angle of the feeding/releasing material arm 21 which is obtained from the pivot angle of the arm driving motor 22 measured by the angle sensor 34 connected to the arm driving motor 22 is input to the control conversion determining part 237 and the arm operation control part 238. The angular velocity information on the angular velocity of the feeding/releasing material arm 21 which is measured by the angular velocity sensor 32 fixed near to the front end of the feeding/releasing material arm 21 is input to the control conversion determining part 237 and the arm operation control part 238.

Next, in step S43, the control conversion determining part 237 determines whether the angular velocity of the feeding/releasing material arm 21 is more than a predetermined threshold value or not based on the angular velocity information output from the angular velocity sensor 32. The predetermined threshold value is indicated by a threshold value S.

If the angular velocity of the feeding/releasing material arm 21 is more than the predetermined threshold value S (YES in step S43), the control conversion determining part 37 determines the gain of the angular velocity information as 1, and it proceeds to step S45.

If the angular velocity of the feeding/releasing material arm 21 is less than the predetermined threshold value S (NO in step S43), the control conversion determining part 237 determines to convert the gain of the angular velocity information, and it proceeds to step S44.

In step S44, the gain adjusting part 235 determines the gain of the angular velocity information as a value of 1 or less than when the angle information and angular velocity information using control part 238b generates the control signal of the arm driving motor 22 based on the angle information and the angular velocity information, and then outputs it to the angle information and angular velocity information using control part 238b. Next to step S44, it proceeds to step S45.

Next to step S43 or step S44, in step S45, the angle information and angular velocity information using control part 238b calculates a torque command value from the control command value, the angle information, the angular velocity information and the gain of the angular velocity information.

Next, in step S46, the torque command value calculated and obtained by the angle information and angular velocity information using control part 238b is input to the motor driver 39.

Then, in step S47, the electric power corresponding to the torque command value is supplied to the driving motor 22 by the motor driver 39. The arm driving motor 22 generates the torque corresponding to the supplied electric power.

Next, in step S48, the arm driving mechanism 23 connected to the arm driving motor 22 is operated by the torque generated by the arm driving motor 22, and the angular velocity of the feeding/releasing material arm 21 connected to the arm driving motor 22 via the arm driving mechanism 23 is accelerated or decelerated by the torque generated by the arm driving motor 22.

Subsequent to step S48, it proceeds to step S41, and in a case in which there is the motor stop command in step S41

(YES in step S41), the feeding/releasing material arm 21 is pivoted by controlling the drive of the arm driving motor 22 to complete the process of positioning the holding hand 12, which is installed at the front end of the feeding/releasing material arm 21, at a predetermined position.

Embodiment 3

Next, the third embodiment will be described as a modified example of the first embodiment and the second embodiment. In this embodiment, it will be described another embodiment of the threshold value which is a criteria to determine whether the angular velocity information is used or not used or to determine a value of the gain, when the torque command value is calculated in the first embodiment or the second embodiment.

Example 1 of Threshold Value

Figure 7A:
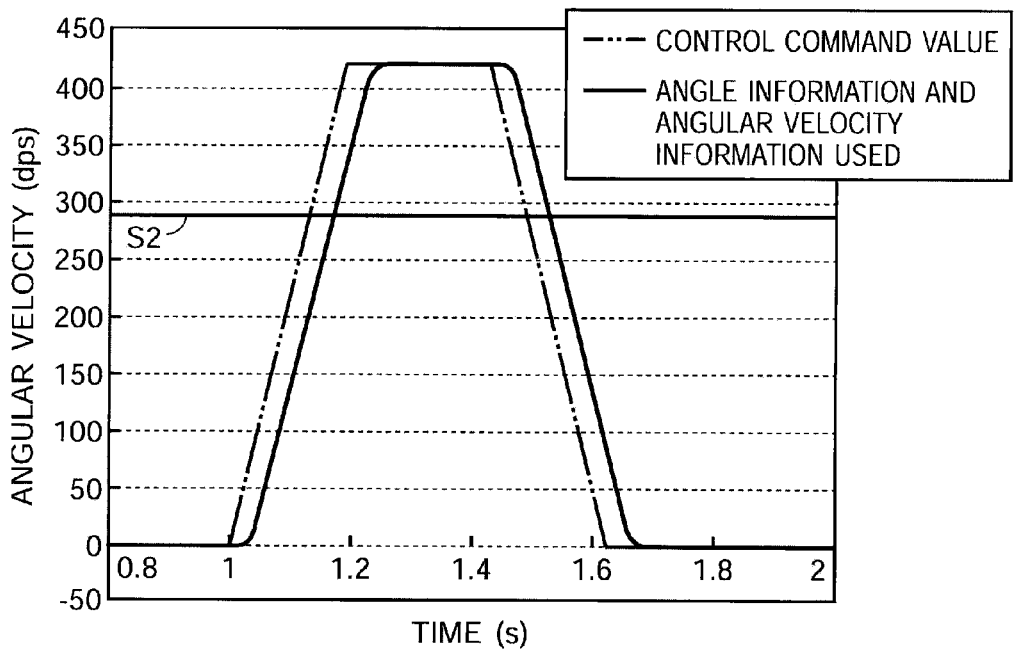
FIG. 7A is a diagram illustrating an example of a relationship between a time lapse and an angular velocity, and a threshold value of the angular velocity while a feeding/releasing material arm is pivoted.
Figure 7B:
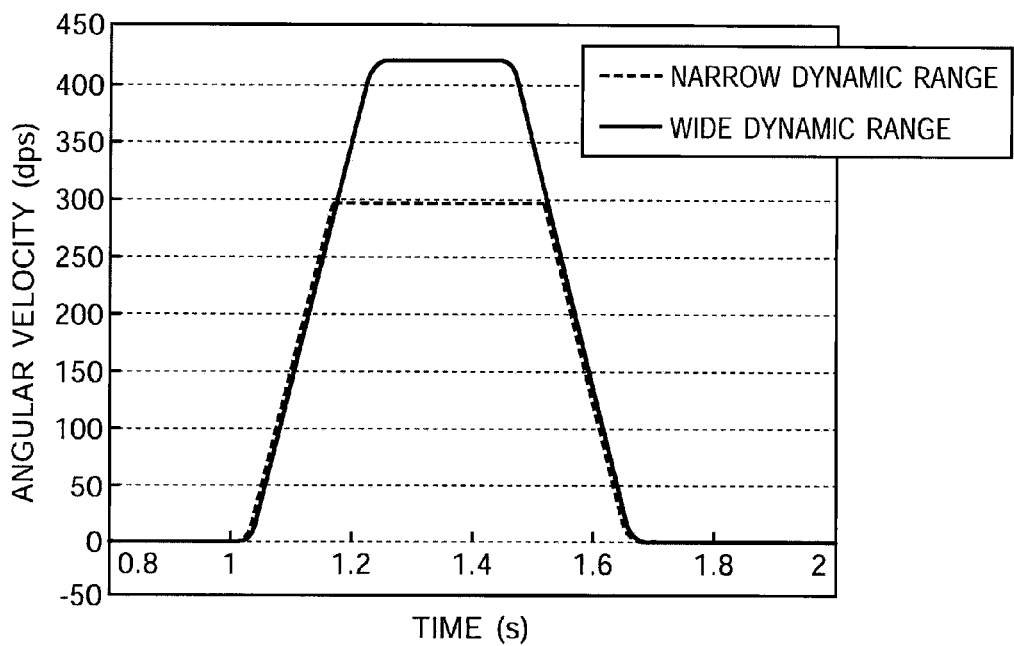
FIG. 7B is a diagram illustrating an example of angular velocity information.

First, another example of defining the threshold value on the angular velocity information will be described with reference to FIGS. 7A and 7B. FIGS. 7A and 7B are explanatory views illustrating an example of the threshold value of the angular velocity as a standard of converting the control. FIG. 7A is a diagram illustrating an example of a relationship between a time lapse and the angular velocity, and a threshold value of the angular velocity while the feeding/releasing material arm is pivoted. FIG. 7B is a diagram illustrating an example of angular velocity information.

The angular velocity indicated by a double-dotted chain line in FIG. 7A is an angular velocity designated for every lapse time as the control command value, and the angular velocity indicated by the solid line is an example of an angular velocity for every lapse time in the case where the state feedback control or the like is performed by using the control command value, the angular velocity information and the angle information. The angular velocity indicated by the solid line in FIG. 7B is an angular velocity measured by using an angular velocity sensor with a wide dynamic range, and the angular velocity indicated by a broken line is an angular velocity measured by using an angular velocity sensor with a relatively narrow dynamic range.

In general, the output of the angular velocity sensor is output as, for example, a voltage, and the voltage to be output is finite. For this reason, if a resolution is increased, the dynamic range is narrowed. The dynamic range of the angular velocity sensor shown in FIG. 7B with the relatively narrow dynamic range is approximately 300 dps, and as shown in FIG. 7B, if the angular velocity of the object to be measured is more than the dynamic range, the output of the angular velocity becomes a constant value. For this reason, in a case in which the angular velocity of the object to be measured is more than the dynamic range, if the control of the robot is performed by using the angular velocity information, the possibility of performing wrong control is high. It is possible to increase the resolution by narrowing the dynamic range. Therefore, since even small fluctuation of the angular velocity can be detected, the precise control can be performed.

In the example of the threshold value, as shown in FIG. 7A, in a case in which the angular velocity is more than the threshold value S2, the angular velocity information is not used, or the control with the gain of the angular velocity information less than 1 is performed.

Example 2 of Threshold Value

Figure 8A:
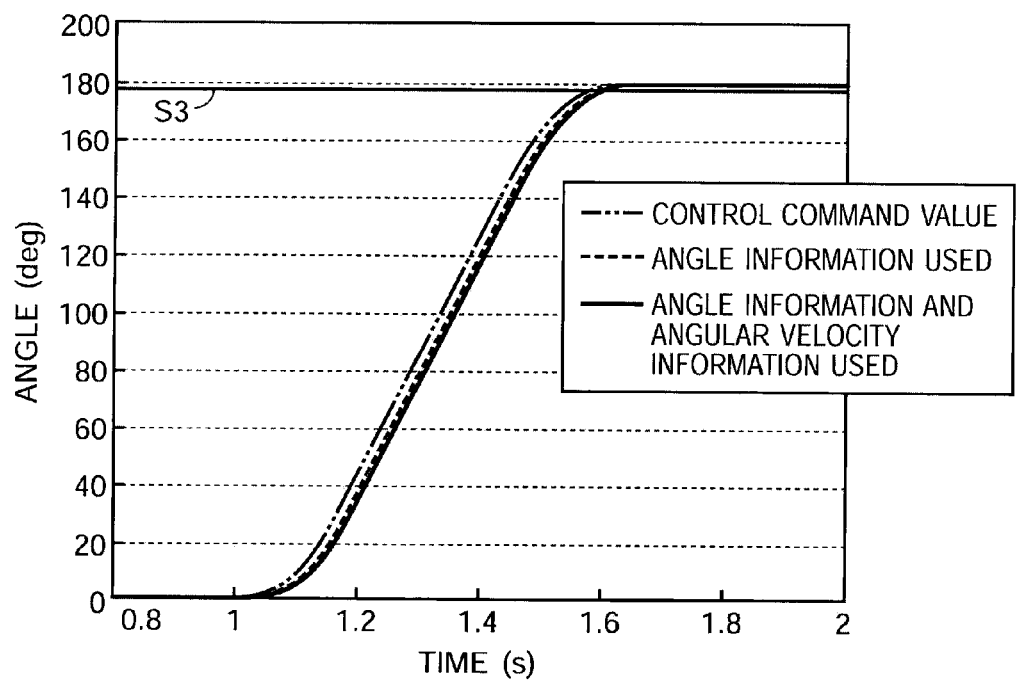
FIG. 8A is a diagram illustrating an example of a relationship between a time lapse and a pivot angle, and a threshold value of the pivot angle while a feeding/releasing material arm is pivoted.
Figure 8B:
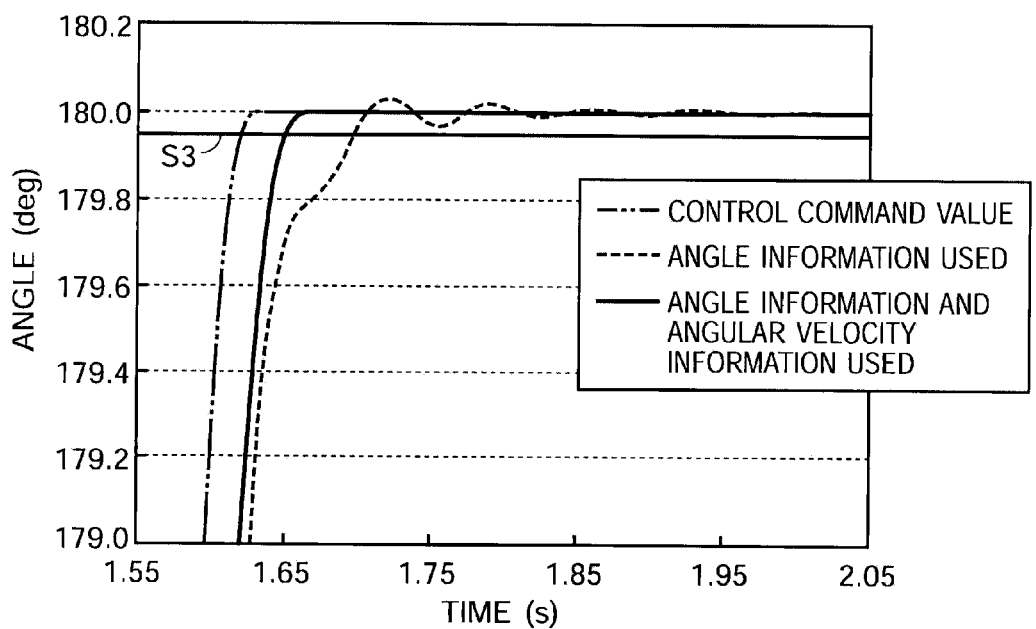
FIG. 8B is a diagram illustrating an example of a relationship between a time lapse and an angle, and a threshold value of the angle while a feeding/releasing material arm is stopped.

Next, an example of defining the threshold value on the angle information will be described with reference to FIGS. 8A and 8B. FIGS. 8A and 8B are explanatory views illustrating an example of the threshold value of the angle as a standard of converting the control. FIG. 8A is a diagram illustrating an example of a relationship between a time lapse and the pivot angle, and a threshold value of the angle while the feeding/releasing material arm is pivoted. FIG. 8B is a diagram illustrating an example of a relationship between a time lapse and the pivot angle, and a threshold value of the angle while the feeding/releasing material arm is stopped.

As shown in FIG. 8A, in a step in which the feeding/releasing material arm 21 is pivoted and the pivoted angle is more than the threshold value S3, the PID control is performed, for example, based on the angle of the angle sensor using the control command value and the angle information, without using the angular velocity information, or the angular velocity of its differential value, or, for example, the state feedback control using the control command value and the angle information, and the angular velocity information, of which the gain is set to be 1 or less, is performed. In a step in which the rotation operation starts and the pivot angle is less than the threshold value S3, the control using the angular velocity information, the control command value and the angle information is performed. The control uses, for example, the state feedback control.

The pivot angle indicated by a double-dotted chain line in FIGS. 8A and 8B is an angle designated for every lapse time as the control command value. The angle indicated by a broken line is an example of an angle for every lapse time in the case where the PID control is performed based on the angle of the angle sensor using the control command value and the angle information, or the angular velocity of its differential value. The angle indicated by the solid line is an example of an angle for every lapse time in the case where the state feedback control or the like is performed by using the control command value, the angular velocity information and the angle information.

In this instance, FIGS. 8A and 8B show the solid line indicating the angle in the case of performing the state feedback control or the like at a slow side in time in order to apparently separate the broken line indicating the angle in the case of performing the PID control from the solid line indicating the angle in the case of performing the state feedback control or the like.

As shown in FIG. 8B, in the case in which the control using the control command value and the angle information is performed, residual vibration may be generated by pivoting the feeding/releasing material arm 21 so as to return the holding hand 12 passing through the wanted position. By generation of the residual vibration, a time is required until the feeding/releasing material arm 21 stops after it almost reaches the wanted position, that is, the residual vibration stabilized.

In the case in which the control using the control command value information, the angular velocity information and the angle information is performed, the vibration is almost not generated. As a result, until the feeding/releasing material arm 21 almost approaches the wanted position and then is stopped, the time is not required.

In the case in which the noise is carried in the angular velocity information, since the vibration is generated by the noise, the precision is deteriorated. It is possible to exclude the influence of the noise by setting the threshold value of the angle converting the control far away from the angle of the vibration with respect to the wanted stop position. By converting the control using the control command value and the angle information, it is possible to suppress the generation of heavy vibration in comparison with the case of using the angular velocity information including the noise.

In addition, by setting the threshold value of the angle converting the control as an angle of a position closer than the maximum angle of the residual vibration in the case in which the control using the control command value and the angle information is performed with respect to the wanted stop position, it is possible to suppress the vibration from generating when the control using the control command value, the angular velocity information and the angle information is performed prior to the time converting the control. It may be assumed that the pivot position (angle) of the feeding/releasing material arm 21 at the time of converting the control is close to the wanted stop position relative to the maximum angle of the residual vibration in the case of performing the control using the control command value and the angle information. Even in the control using the control command value and the angle information, there is a high possibility to position the feeding/releasing material arm 21 at the wanted stop position, without generating the vibration exceeding the maximum angle of the residual vibration in the case of performing the control using the control command value and the angle information. For this reason, in comparison with a case of performing the control using the control command value and the angle information without performing the control using the control command value, the angular velocity information and the angle information, the maximum angle of the residual vibration is lowered, so that it is possible to decrease the time until the residual vibration stabilized.

Example 3 of Threshold Value

Figure 9A:
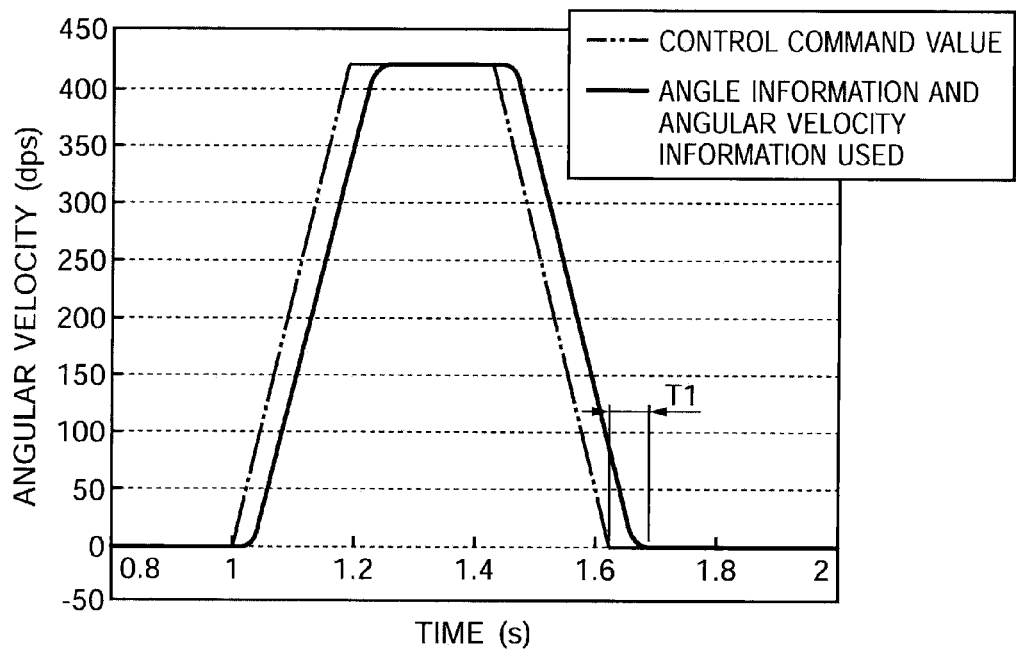
FIG. 9A is a diagram illustrating an example of a relationship between time lapse and an angular velocity, and a threshold value defined on a time axis with respect to a wanted stop position which is a specific point of a control command value while a feeding/releasing material arm is pivoted.
Figure 9B:
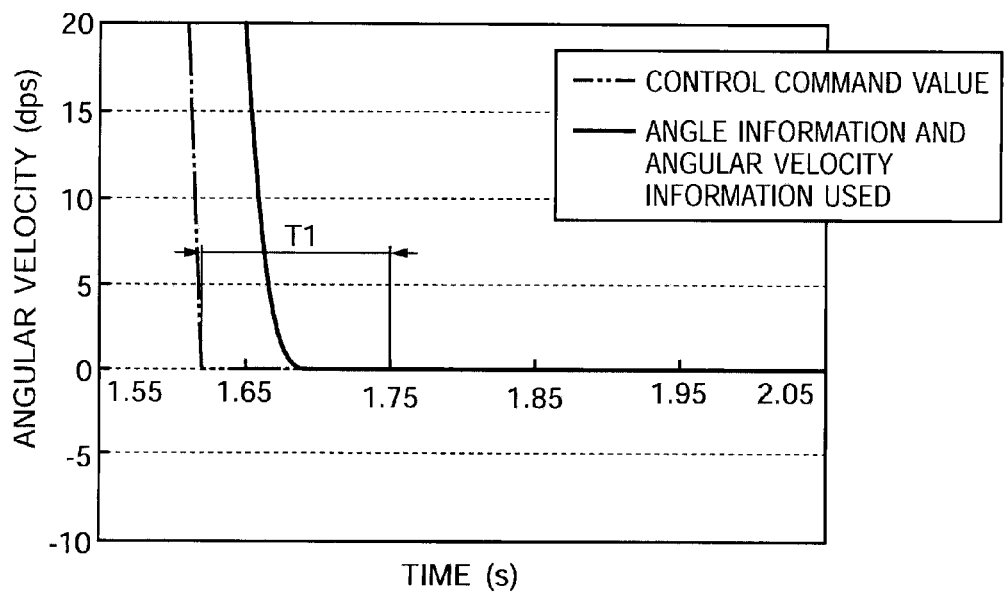
FIG. 9B is a diagram illustrating an example of a relationship between a time lapse and an angular velocity in the vicinity of a wanted stop position which is a specific point of a control command value, and a threshold value defined on a time axis with respect to the wanted stop position which is the specific point of the control command.

Next, an example of defining the threshold value on a time axis with a specific point of the control command value will be described with reference to FIGS. 9A and 9B. FIGS. 9A and 9B are explanatory views illustrating an example of the threshold value defined on the time axis with respect to the specific point of the control command value as a standard of converting the control. FIG. 9A is a diagram illustrating an example of a relationship between a time lapse and the pivot angle, and a threshold value defined on the time axis with respect to the wanted stop position which is a specific point of the control command value, while the feeding/releasing material arm is pivoted. FIG. 9B is a diagram illustrating an example of a relationship between a time lapse and the angular velocity near to the wanted stop position which is the specific point of the control command value, and a threshold value defined on the time axis with respect to the wanted stop position which is a specific point of the control command valued.

The angular velocity indicated by a double-dotted chain line in FIGS. 9A and 9B is an angular velocity designated for every lapse time as the control command value. The angle indicated by a solid line is an example of an angular velocity for every lapse time in the case where the state feedback control or the like is performed by using the control command value and the angular velocity information, and the angle information.

As shown in FIGS. 9A and 9B, in the control command value, after the angular velocity becomes zero and then the time T1 of a threshold time passes from the time when it reaches the wanted stop position, the PID control is performed, for example, based on the angle of the angle sensor using the control command value and the angle information, without using the angular velocity information, or the angular velocity of its differential value, or, for example, the state feedback control using the control command value and the angle information, and the angular velocity information, of which the gain is set to be 1 or less, is performed. After the pivot operation starts, the control using the angular velocity information, the control command value and the angle information is performed during the time when the angular velocity becomes zero and between the time when the angular velocity becomes zero to the time T1 in the control command value. The control uses, for example, the state feedback control.

As shown in FIG. 9B, if a predetermined time T1 passes from the time when the angular velocity of the control command value becomes zero, the angular velocity of the feeding/releasing material arm 21 becomes close to zero. In a state in which the angular velocity of the feeding/releasing material arm 21 does not become zero and the torque command value to drive the arm driving motor 22 is output, there is high possibility for abnormality to occur in the control system. The abnormality of the control system is, for example, a state in which the angular velocity sensor 32 is out of order, or the angular velocity information is not precise due to the noise or the like. Alternatively, by performing the control using the control command value and the angle information, or the control using the control command value and the angle information, and the angular velocity information of which the gain is set to be 1 or less, it is possible to exclude these abnormal factors.

If the predetermined time T1 passes from the time when the angular velocity of the control command value becomes zero, it may be assumed that the pivot position (angle) of the feeding/releasing material arm 21 is close to the wanted stop position. For this reason, in the control using the control command value and the angle information, it is highly possible to position the feeding/releasing material arm 21 at the wanted stop position, without generating the vibration almost.

Embodiment 4

A fourth embodiment of a robot, a carriage device and a control method using an inertia sensor will now be described. In this embodiment, an example of the robot or the carriage device different from the feeding/releasing material device described in the first embodiment or the second embodiment will be described.

Feeding/Releasing Material Device

Figure 10:
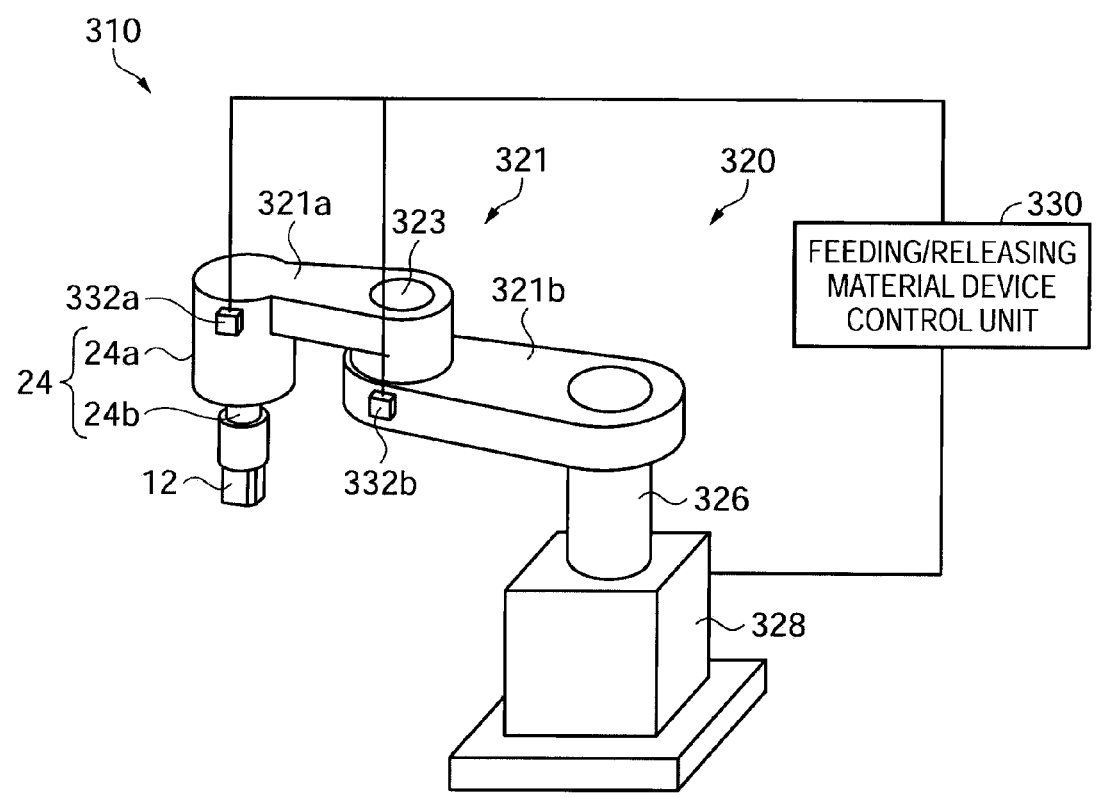
FIG. 10 is a perspective view schematically illustrating the external configuration of a feeding/releasing material device.

As the feeding/releasing material device according to one embodiment of the robot, the carriage device, and the control method using the inertia sensor, a feeding/releasing material device 310 which is different from the feeding/releasing material device 10 or the feeding/releasing material device 210 described in the first embodiment or the second embodiment will be described with reference to FIG. 10. FIG. 10 is a perspective view schematically illustrating an external configuration of the feeding/releasing material device.

As shown in FIG. 10, the feeding/releasing material device 310 includes a holding hand 12, a robot mechanism 320, a feeding/releasing material device control unit 330, an angular velocity sensor 332a, an angular velocity sensor 332b, and two angle sensors (not illustrated).

The robot mechanism 320 includes a hand holding mechanism 24, a feeding/releasing material arm 321, an arm shaft part 326, and a base 328. The base 328 supports the arm shaft part 326 in such a way that the arm shaft part can be rotated around a rotational shaft of the arm shaft part 326 via a built-in bearing mechanism (not illustrated) and can be precisely positioned. The arm shaft part 326 is connected to an arm driving motor (not illustrated) built in the base 328 via an arm driving mechanism (not illustrated), and thus is pivoted by the arm driving motor. The arm driving motor is connected to the angle sensor, and a pivot angle of the arm driving motor is measured by the angle sensor.

An end portion of the arm shaft part 326 which is opposite to its end portion supported by the base 328 is fixed to one end portion of the feeding/releasing material arm 321. The feeding/releasing material arm 321 has an arm portion 321a, an arm portion 321b, and an arm articulated portion 323. One end of the arm portion 321a is connected to one end of the arm portion 321b via the arm articulated portion 323. The other end of the arm portion 321b which is opposite to the one end connected to the arm articulated portion 323 is fixed to the arm shaft part 326. Since the arm shaft part 326 is freely pivoted around the rotational shaft of the arm shaft part 326 with respect to the base 328, the arm portion 321b with one end fixed to the arm shaft part 326 is freely pivoted around the rotational shaft of the arm shaft part 326 with respect to the base 328.

The arm portion 321b supports the arm portion 321a in such a way that it is pivoted around the rotational shaft of the arm articulated portion 323 through the arm articulated portion 323. The portion of the arm articulated portion, to which the arm portion 321a of the arm articulated portion 323 is fixed, is connected to an arm portion driving motor (not illustrated) built in the arm portion 321b via an arm portion driving mechanism (not illustrated), and is pivoted by the arm portion driving motor. An angle of the arm portion 321a and the arm portion 321b with respect to the arm articulated portion 323 can be adjusted. That is, the feeding/releasing material arm 321 can be flexibly extended with respect to the arm articulated portion 323. The arm angle sensor is connected to the arm portion driving motor, and the pivot angle of the arm portion driving motor is measured by the arm angle sensor. It is possible to measure the pivot angle of the arm portion 321a with respect to the arm portion 321b by measuring the pivot angle of the arm portion driving motor.

An axial direction of the rotational shaft of the arm shaft part 326 is substantially parallel with an axial direction of the rotational shaft of the arm articulated portion 323.

The end portion of the arm shaft portion 321a which is opposite to the end thereof fixed to the arm articulated portion 323 is fixed to the hand holding mechanism 24. The hand holding mechanism 24 has a holding bearing 24a fixed to the arm portion 321a, and a holding mechanism shaft 24b which can be slidably supported and precisely positioned on the holding bearing 24a. The holding mechanism shaft 24b can be slidably supported with respect to the holding bearing 24a in an axial direction of the holding mechanism shaft 24b by a vertically driving source (not illustrated). The axial direction of the holding mechanism shaft 24b is substantially parallel with the axial direction of the rotational shaft of the arm shaft part 326 and the axial direction of the rotational shaft of the arm articulated portion 323.

A holding hand 12 is attached to a free end of the holding mechanism shaft 24b. The holding hand 12 is located at a position faced to an object to be carried by rotating and flexibly extending the feeding/releasing material arm 321. By sliding the holding mechanism shaft 24b with respect to the holding bearing 24a, the holding hand 12 is separated from and connected to the object to be carried, and simultaneously, the object to be carried which is held by the holding hand 12 is lifted from a placing location or is drawn close to the placing location.

The angular velocity sensor 332a is fixed to the hand holding mechanism 24 attached with the holding hand 12, opposite to the holding hand 12. That is, the angular velocity sensor 332a is fixed to the front end of the arm portion 321a to measure the angular velocity of the arm portion 321a to be pivoted.

The angular velocity sensor 332b is fixed to the side of one end of the arm portion 321b which is connected to the arm articulated portion 323. Accordingly, the angular velocity sensor 332b is fixed to the front end of the arm portion 321b to measure the angular velocity of the arm portion 321b to be pivoted.

The feeding/releasing material device control unit 330 controls the overall operation of each part of the feeding/releasing material device 310 based on a control program previously input through an information input/output device (not illustrated). The feeding/releasing material device control unit 330 can control the operation of the arm portion 321b based on angular velocity information from the angular velocity sensor 332b and angle information from the angle sensor built in the base 328. Simultaneously, relative movement of the arm portion 321a with respect to the arm portion 321b can be controlled based on angular velocity information from the angular velocity sensor 332a and angle information from the arm angle sensor built in the arm portion 321b. That is, the operation of the feeding/releasing material arm 321 generally handling the operation of the arm portion 321a and the arm portion 321b can be controlled by using the angular velocity information and the angle information, similar to the above-mentioned embodiments.

Carriage Device

Figure 11A:
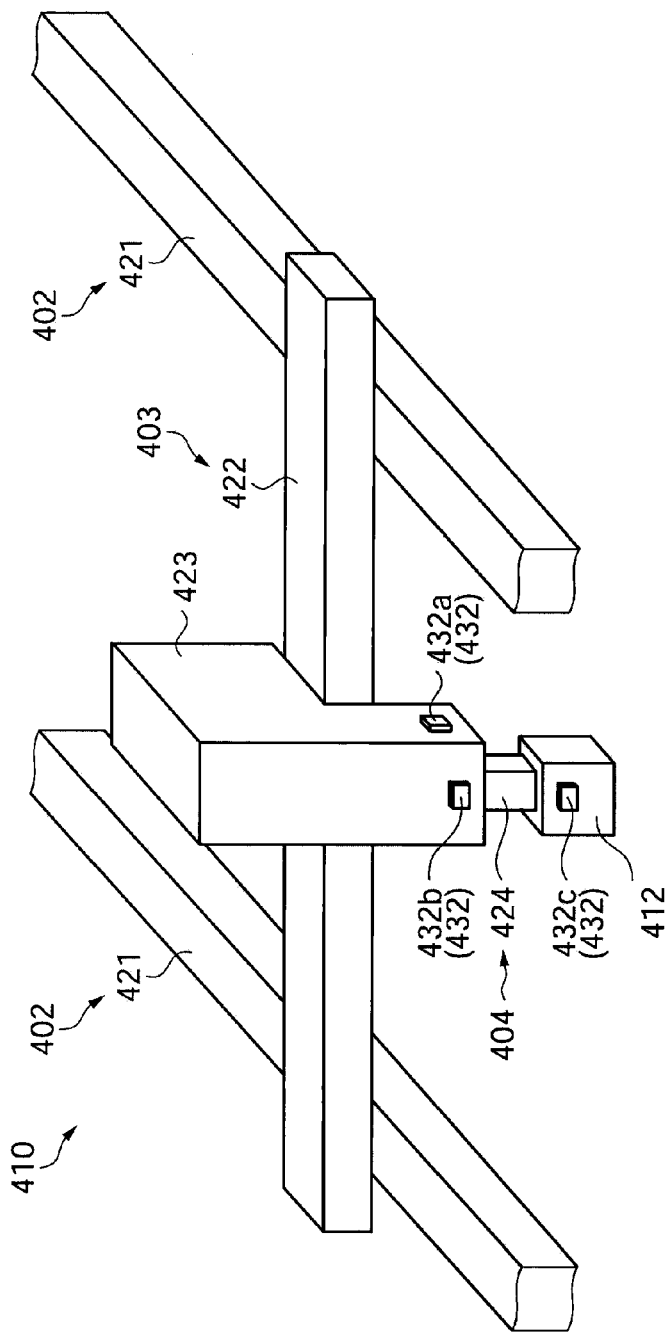
FIGS. 11A and 11B are perspective views schematically illustrating the external configuration of a carriage device.
Figure 11B:
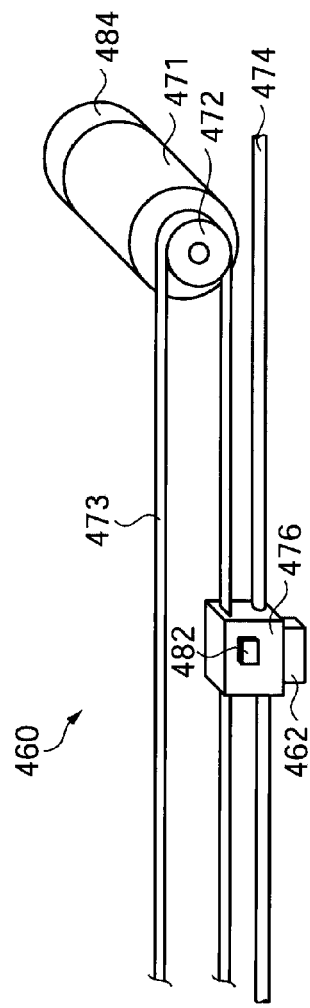

Next, the carriage device including a holding device for holding a target object which moves in parallel along an orthogonal coordinates system will be described with reference to FIGS. 11A and 11B. FIGS. 11A and 11B are perspective views schematically illustrating the external configuration of the carriage device. FIG. 11A is a perspective view schematically illustrating an external configuration of a ceiling suspension carriage device. FIG. 11B is a perspective view schematically illustrating an external configuration of a head carriage device in a printing machine.

Ceiling Suspension Carriage Device

As shown in FIG. 11A, a ceiling suspension carriage device 410 includes a main scanning direction movable mechanism 402, a subsidiary scanning direction movable mechanism 403, a lift movable mechanism 404, a holding mechanism 412, a distance sensor, an acceleration sensor 432, and a carriage device control unit (not illustrated).

The main scanning direction movable mechanism 402 has a pair of main scanning guide rails 421 and 421 extending in a main scanning direction, a main scanning linear motor formed on the main scanning guide rail 421, and a main scanning slider formed on a main plate 422. The scanning plate 422 is placed between the pair of main scanning guide rails 421 and 421, and extends in a subsidiary scanning direction substantially perpendicular to the main scanning direction. The scanning plate 422 is freely moved in the main scanning direction by the main scanning linear motor and the main scanning slider. The pair of main scanning guide rails 421 and 421 is suspended from, for example, a ceiling.

The subsidiary scanning direction movable mechanism 403 has a subsidiary scanning linear motor formed on the scanning plate 422, and a subsidiary scanning slider formed on a subsidiary scanning frame 423. The subsidiary scanning frame 423 is freely moved in the subsidiary scanning direction by the subsidiary scanning linear motor and the subsidiary scanning slider.

The lift movable mechanism 404 has a ball bearing placed in the subsidiary scanning frame 423, a ball bearing driving motor, and a ball screw fixed to a lift shaft 424. The lift shaft 424 is lifted by the ball bearing, the ball bearing driving motor and the ball screw.

The holding mechanism 412 fixed to the lift shaft 424 at a position opposite to the ball screw is moved to an optional position in the main scanning direction and the subsidiary scanning direction by the main scanning direction movable mechanism 402 and the subsidiary scanning direction movable mechanism 403, and can be detached from and comes into contact with the target object by the lift movable mechanism 404.

The carriage device control unit controls the overall operation of each part of the ceiling suspension carriage device 410 based on the control program which is previously input via the information input/output device (not illustrated).

The main scanning linear motor, the subsidiary scanning linear motor, and the ball bearing driving motor are respectively connected to a distance sensor for measuring a driving distance by the motors.

The acceleration sensor 432a, the acceleration sensor 432b or the acceleration sensor 432c are fixed to the subsidiary scanning linear motor 423 or the holding mechanism 412. The acceleration sensor 432a, the acceleration sensor 432b and the acceleration sensor 432c can measure the acceleration in the main scanning direction, the subsidiary scanning direction or the lift direction.

The movement of the holding mechanism 412 can be controlled by the moving distance information in each direction by the distance sensor connected to the main scanning linear motor, the subsidiary scanning linear motor or the ball bearing driving motor, and the acceleration information in each direction by the acceleration sensor 432a, the acceleration sensor 432b or the acceleration sensor 432c. As the distance sensor, for example, a linear encoder may be used. The distance sensor corresponds to a position sensor.

When the movement of the holding mechanism 412 is controlled by using the moving distance information and the acceleration information, a threshold value is previously set in the moving distance information or the acceleration information, and the control conversion determining unit of the carriage device control unit compares the moving distance information or the acceleration information with the threshold value to determine whether the acceleration information is used or not for the control or to determine a constant to be multiplied to the acceleration information. The operation control part of the carriage device control unit performs the control using the control command value and the moving distance information, the control using the control command value and the moving distance information, and the acceleration information, or the control using the acceleration information resulted by multiplying the control command value and the moving distance information by a gain of the acceleration information, according to the determination of the control conversion determining unit. By performing the control, the operation of the main scanning direction movable mechanism 402, the subsidiary scanning direction movable mechanism 403 and the lift movable mechanism 404 is controlled, so that the holding mechanism 412 is moved to an optional position to determine the position.

Head Carriage Device

As shown in FIG. 11B, the head carriage device 460 is to move an ejection head 462 of the printing machine, and includes a head carriage 476, a carriage shaft 474, a driving belt 473, a driving pulley 472, a driving motor 471, an acceleration sensor 482, and an encoder 484. The printing machine includes a printing machine control unit (not illustrated) for controlling the overall operation of each part of the printing machine.

The driving motor 471 is fixed to a machine frame which is not shown, and the driving pulley 472 is fixed to one end of the driving shaft. The driving belt 473 is located between the driving pulley 472 and a driven pulley (not illustrated), and the driving belt 473 is driven by the driving motor 471. The carriage shaft 474 is placed in parallel with the extension direction of the driving belt 473. The head carriage 476 is engaged with and supported by the carriage shaft 474 in such a way that the head carriage can be slid in an axial direction of the carriage shaft 474. The head carriage 476 is fixed with the driving belt 473, and is moved along the carriage shaft 474 by driving of the driving belt 473. The ejection head 462 held by the head carriage 476 is moved in the axial direction of the carriage shaft 474 and is held at an optional position.

The printing machine control unit controls the overall operation of each part of the printing machine based on the control program previously input through the information input/output device (not illustrated).

The encoder 484 is connected to the driving shaft of the driving motor 471, and measures the pivot angle of the driving motor 471 to measure the moving distance of the ejection head 462. The pivot angle information of the driving motor 471 corresponding to the position of the ejection head 462 corresponding to the moving distance is indicated by the position information of the driving motor 471. The acceleration sensor 482 is fixed to the head carriage 476, and can measure the acceleration acting on the head carriage 476 by driving of the head carriage 476. The movement of the ejection head 462 held by the head carriage 476 can be controlled by the position information from the encoder 484 and the acceleration information from the acceleration sensor 482. The encoder 484 corresponds to a position sensor.

When the movement of the ejection head 462 is controlled by using the position information and the acceleration information, a threshold value is previously set in the position information or the acceleration information, and the control conversion determining unit of the printing machine control unit compares the position information or the acceleration information with the threshold value to determine whether the acceleration information is used or not for the control or to determine a weighted constant to be multiplied to the acceleration information. The operation control part of the printing machine control unit performs the control using the control command value and the position information, the control using the control command value and the position information, and the acceleration information, or the control using the acceleration information resulted by multiplying the control command value and the position information by the weighted constant, according to the determination of the control conversion determining unit. By performing the control, the operation of the driving motor 471 is controlled, so that the ejection head 462 held by the head carriage 476 is moved to an optional position to determine the position.

Laser Printer

Figure 12:
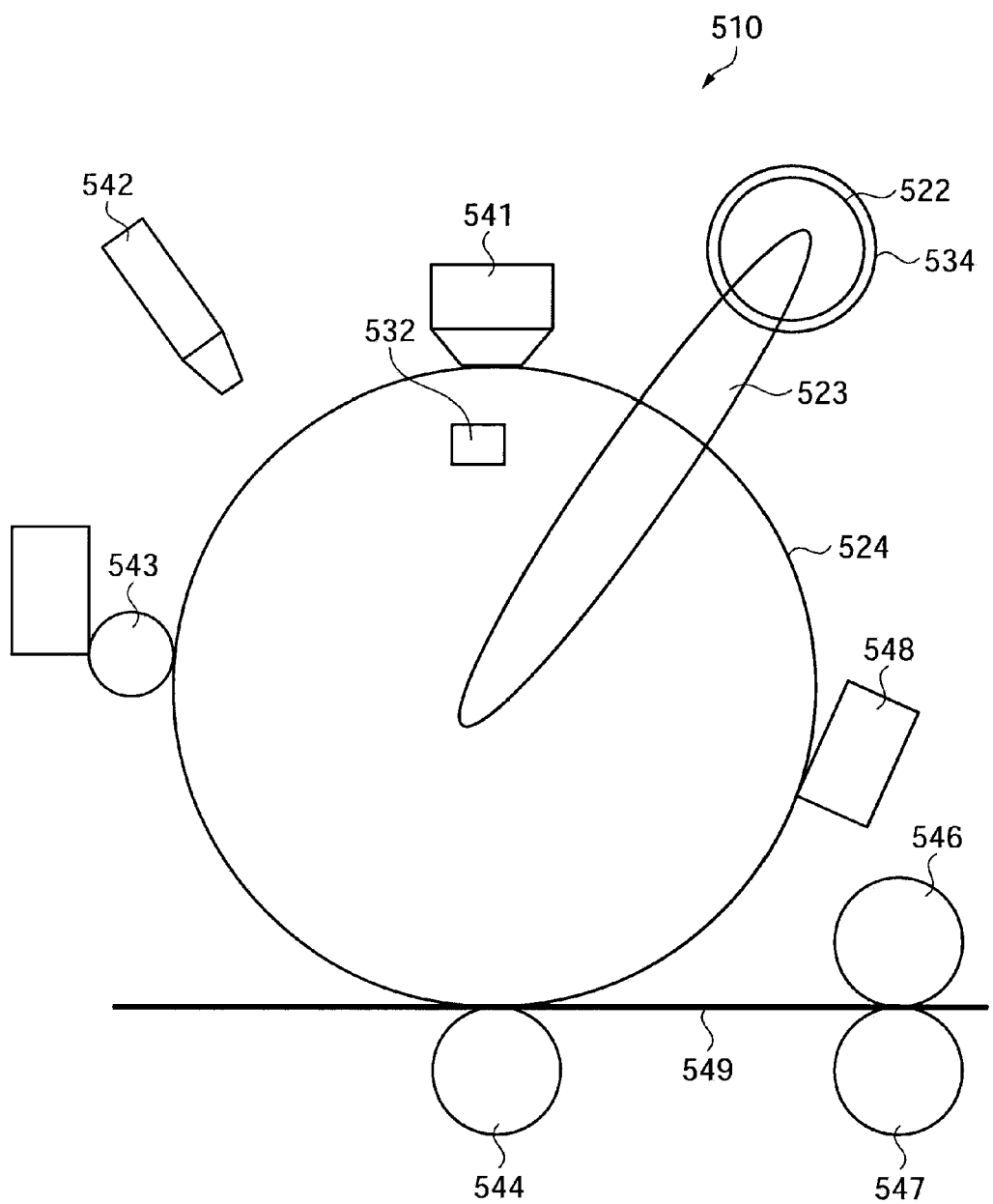
FIG. 12 is a diagram schematically illustrating a major part of a laser printer.

Next, as an example of controlling rotation of a drum-shaped member, a laser printer 510 will be described with reference to FIG. 12. FIG. 12 is a diagram schematically illustrating a major part of the laser printer.

As shown in FIG. 12, the laser printer 510 includes a photoreceptor drum 524, a drum driving motor 522, an encoder 534, a driving transmission mechanism 523, a charging unit 541, a laser oscillation unit 542, a toner supply unit 543, a transfer roller 544, a fixing roller 546 and a fixing roller 547, a toner recovery unit 548, an angular velocity sensor 532, and a printer control unit (not illustrated).

The photoreceptor drum 524 is connected to the drum driving motor 522 via the driving transmission mechanism 523, and is rotated around the rotational shaft by the drum driving motor 522. The surface of the photoreceptor drum 524 is negatively charged by the charging unit 541, and an electrostatic portion is remained in a shape of printing by the laser oscillation unit 542 to draw the shape of the printing. The toner supplied by the toner supply unit 543 is adhered to the shape of the charged printing. A sheet 549 is pressed against the photoreceptor drum 524 by the transfer roller 544, so that the toner is transferred to the sheet 549. The toner transferred to the sheet 549 is applied by pressure and heat from the fixing roller 546 and the fixing roller 547, and thus is fixed. Unnecessary toner is recovered from the surface of the photoreceptor drum 524 transferred with the toner by the toner recovery unit 548, and then the above process is repeated.

The printer control unit controls the overall operation of each part of the laser printer 510 based on the control program previously input through the information input/output device (not illustrated).

The encoder 534 is connected to the driving shaft of the drum driving motor 522, and measures the pivot angle of the drum driving motor 522 to measure the rotation angle information of the photoreceptor drum 524 by the encoder 534. The angular velocity sensor 532 is fixed to the photoreceptor drum 524, and can obtain the angular velocity information on the pivoting photoreceptor drum 524 from the acceleration sensor 532. The rotation of the photoreceptor drum 524 can be controlled by the pivot angle information of the drum driving motor 522 by the encoder 534, and the angular velocity information from the angular velocity sensor 532.

When the rotation of the photoreceptor drum 524 is controlled by using the pivot angle information and the angular velocity information, a threshold value is previously set in the pivot angle information or the angular velocity information, and the control conversion determining unit of the printer control unit compares the pivot angle information or the angular velocity information with the threshold value to determine whether the angular velocity information is used or not for the control or to determine a weighted constant to be multiplied to the angular velocity information. The operation control part of the printer machine control unit performs the control using the control command value and the pivot angle information, the control using the control command value and the pivot angle information, and the angular velocity information, or the control using the angular velocity information resulted by multiplying the control command value and the pivot angle information by the weighted constant, according to the determination of the control conversion determining unit. By performing the control, the operation of the drum driving motor 522 is controlled, so that the photoreceptor drum 524 is rotated at an optional angle.

Although preferred embodiments are described with reference to the accompanying drawings, the invention is not limited to the preferred embodiments. The embodiments can be implemented by the following within the range departing from the gist of the invention, and may be variously modified.

Modified Example 1

In the embodiment, although the example of defining the threshold value for the pivot angle information, the angular velocity information, the moving distance information, the acceleration information or the position information, or the example of defining the threshold value on the time axis with respect to the specific point of the control command value has been described, the object defining the threshold value is not limited thereto. It may be determined whether the angular velocity information or the acceleration information is used or not, by setting the threshold value for the noise affecting the value of the angular velocity information or the acceleration information and using a level of the noise, or the constant which is multiplied to the angular velocity information or the acceleration information may be determined so as to adjust the influence of the angular velocity information or the acceleration information. As the noise affecting the value of the angular velocity information or the acceleration information, there is mechanical vibration of the machine itself, vibration of an apparatus existing around the machine, dispersion of a power supplied to the machine, or surrounding electron noise.

Modified Example 2

In the embodiment, although the example of defining the threshold value for the angular velocity information by the angular velocity sensor 32 or the acceleration information by the acceleration sensor 432 has been described, the object defining the threshold value is not limited thereto. The threshold value may be defined for the integral value of one or more times of the angular velocity information or the acceleration information. The integral value of the acceleration information is velocity information, and the velocity information may be treated similar to the angular velocity information. The integral value of two times of the acceleration information and the integral value of the angular velocity information is information of the moving distance, and the information of the moving distance may be treated similar to the angle information or the position information.

Modified Example 3

In the embodiment, although the example of defining the threshold value for the angle information by the angle sensor 34 or the moving distance information by the distance sensor has been described, the object defining the threshold value is not limited thereto. The threshold value may be defined for the differential value of one or more times of the angle information or the moving distance information. The differential value of the angle information or the moving distance information may be treated similar to the angular velocity information as the angular velocity or the moving velocity. The differential value of two times of the angle information or moving distance information may be treated similar to the acceleration information as the angular acceleration or the acceleration.

Modified Example 4

In the embodiment, the example of defining the threshold value for the pivot angle information, the angular velocity information, the moving distance information, the acceleration information or the position information, or the example of defining the threshold value on the time axis with respect to the specific point of the control command value has been described. Although the object defined with the threshold value is used exclusively when the control is performed, the control may be performed by using plural objects defining the threshold value. For example, in only case in which both the pivot angle information and the angular velocity information exceed the threshold values, the control may be performed by not using the angular velocity information. In a case in which at least one of the pivot angle information and the angular velocity information does not exceed the threshold values, the control may be performed by using the pivot angle information or the angular velocity information. In addition, the pivot angle information, the angular velocity information, the moving distance information, the acceleration information or the position information, or the time axis with respect to the specific point of the control command value may be combined with the noise level affecting the value of the angular velocity information or the acceleration information described in Modified Example 1. In this instance, for example, in a case in which both sides of the pivot angle information, the angular velocity information, the moving distance information, the acceleration information or the position information, or the time axis with respect to the specific point of the control command value, and the noise level exceed the threshold value, the control is performed by not using the angular velocity information. In a case in which at least one side exceeds the threshold value, the control is performed by using pivot angle information and the angular velocity information. Consequently, irrespective of that the noise level such as angular velocity information is maintained in a low level, it is possible to elude the state where the control is performed by not using the angular velocity information, in order to prevent the adverse effect by the noise.

Modified Example 5

In the embodiment, as an example of the robot and carriage device, although the feeding/releasing material device 10 including the robot mechanism 20, the feeding/releasing material device 310 including the robot mechanism 320, the ceiling suspension carriage device 410, the head carriage device 460 provided in the printing machine, and the drum driving device provided in the laser printer 510 has been described by way of an example, the robot and carriage device which can be appropriately controlled by using the control method using the inertia sensor are not limited to the illustrative devices. By using the control method using the inertia sensor, a device capable of quickly moving the movable body to a predetermined target position and quickly stopping it at the position with high precision can be appropriately controlled.

What is claimed is:

1. A robot comprising:
   an arm with one end pivotally supported;
   a driving source that pivots the arm;
   an angle sensor that detects a pivot angle of the driving source and outputs pivot angle information of the driving source;
   a gyro sensor that is attached to the arm and outputs inertial force information of an inertial force acting on the arm;
   a control command generating unit configured to output a control command defining a rotational operation of the arm;
   a control conversion determining unit configured to determine a weighted constant of the inertial force information when the rotation operation of the arm is controlled by the driving source; and
   an arm operation control unit configured to control the driving source and thus controls the rotation operation of the arm based on the control command, the pivot angle information, and weighted inertial force information that is obtained by multiplying the inertial force information by the weighted constant, wherein
   the control conversion determining unit compares the inertial force information with a predetermined inertial force threshold value to determine whether the inertial force information is used for controlling the rotation operation of the arm, and
   the control conversion determining unit compares the pivot angle information with a predetermined pivot angle threshold value to determine whether the inertial force information is used for controlling the rotation operation of the arm.

2. The robot according to claim 1, wherein
   the control conversion determining unit compares an integral value of one or more times of the inertial force information with a predetermined integral inertial force threshold value to determine whether the inertial force information is used for controlling the rotation operation of the arm.

3. The robot according to claim 1, wherein
   the control conversion determining unit compares a differential value of one or more times of the pivot angle information with a predetermined pivot angle threshold value to determine whether the inertial force information is used for controlling the rotation operation of the arm.

4. The robot according to claim 1, wherein
   the control conversion determining unit compares a lapse time from a specific point of the control command with a predetermined time axis threshold value, which is in a time axis and is obtained based on the specific point of the control command, to determine whether the inertial force information is used for controlling the rotation operation of the arm.

5. The robot according to claim 1, wherein
   the control conversion determining unit compares noise affecting the inertial force information with a predetermined noise threshold value to determine whether the inertial force information is used for controlling the rotation operation of the arm.

* * * * *